US012286090B2

(12) United States Patent
Bernatchez et al.

(10) Patent No.: US 12,286,090 B2
(45) Date of Patent: Apr. 29, 2025

(54) WATERCRAFT AND CONTROL METHOD THEREFOR

(71) Applicant: TAIGA MOTORS INC., Lasalle (CA)

(72) Inventors: Gabriel Bernatchez, Lasalle (CA); Cyrus Larsen, Lasalle (CA)

(73) Assignee: TAIGA MOTORS INC.

( * ) Notice: Subject to any disclaimer, the term of this patent is extended or adjusted under 35 U.S.C. 154(b) by 477 days.

(21) Appl. No.: 17/720,596

(22) Filed: Apr. 14, 2022

(65) Prior Publication Data

US 2022/0332398 A1 Oct. 20, 2022

Related U.S. Application Data

(60) Provisional application No. 63/177,122, filed on Apr. 20, 2021.

(51) Int. Cl.

| | |
|---|---|
| ***B60W 10/08*** | (2006.01) |
| ***B60L 3/12*** | (2006.01) |
| ***B63H 11/113*** | (2006.01) |
| ***B63H 21/17*** | (2006.01) |
| ***B63H 21/21*** | (2006.01) |

(52) U.S. Cl.

CPC ............... *B60W 10/08* (2013.01); *B60L 3/12* (2013.01); *B63H 11/113* (2013.01); *B63H 21/17* (2013.01); *B63H 21/21* (2013.01); *B60L 2240/32* (2013.01); *B60L 2240/421* (2013.01); *B60L 2240/423* (2013.01)

(58) Field of Classification Search

CPC ....... B60W 10/08; B60L 3/12; B60L 2240/32; B60L 2240/421; B60L 2240/423; B63H 11/113; B63H 21/17; B63H 21/21

See application file for complete search history.

(56) References Cited

U.S. PATENT DOCUMENTS

| | | | | |
|---|---|---|---|---|
| 6,361,385 | B1 * | 3/2002 | Bland | B63H 25/382 440/6 |
| 6,416,368 | B1 | 7/2002 | Griffith, Sr. et al. | |
| 6,857,918 | B1 | 2/2005 | Lebreux et al. | |
| 9,517,826 | B1 | 12/2016 | Leblond | |
| 9,682,757 | B1 | 6/2017 | Bourret | |
| 9,908,601 | B2 | 3/2018 | Vachon | |
| 10,689,077 | B1 | 6/2020 | Railey et al. | |
| 2003/0019414 | A1 * | 1/2003 | Borrett | B63H 25/02 114/144 B |
| 2022/0332303 | A1 * | 10/2022 | Bernatchez | B60L 3/0023 |

FOREIGN PATENT DOCUMENTS

| | | |
|---|---|---|
| WO | 2021084520 | 5/2021 |

* cited by examiner

*Primary Examiner* — Stephen P Avila

(74) *Attorney, Agent, or Firm* — Norton Rose Fulbright Canada LLP

(57) ABSTRACT

Systems and methods for controlling the direction of propulsion of an electric vehicle are provided. According to an embodiment, a method can include receiving a first signal from a first user input device; operating an electric motor in a first direction based on the first signal to propel a watercraft in a forward direction; receiving a second signal from a second user input device; and operating the electric motor in a second direction based on the second signal to propel the watercraft in a reverse direction.

18 Claims, 9 Drawing Sheets

WATERCRAFT AND CONTROL METHOD THEREFOR

CROSS-REFERENCE TO RELATED APPLICATIONS

This application claims priority from U.S. Provisional Patent Application No. 63/177,122, filed Apr. 20, 2021, which is incorporated by reference in its entirety herein.

FIELD

This specification relates to personal watercraft and, more specifically, to a method of controlling operation of a personal watercraft.

BACKGROUND

Some personal watercraft generate a jet of water to propel the personal watercraft in a forward direction of travel. It may sometimes be desirable for a personal watercraft to travel in a direction opposite to the forward direction, i.e., a reverse direction. While reverse functionalities on personal watercraft have been satisfactory to a certain degree, there remains room for improvement.

SUMMARY

In one aspect, the disclosure describes a method of controlling a watercraft, the watercraft comprising an electric motor, a first user input device, and a second user input device separate from the first user input device, the method comprising: receiving a first signal from the first user input device; operating the electric motor in a first direction based on the first signal to propel the watercraft in a forward direction; receiving a second signal from the second user input device; and operating the electric motor in a second direction based on the second signal to propel the watercraft in a reverse direction.

In some embodiments, the method can further include: responsive to receiving the second signal, ceasing operation of the electric motor in the first direction to reduce a speed of the electric motor, wherein operating the electric motor in the second direction based on the second signal is performed responsive to the speed of the electric motor being less than or equal to a threshold speed.

In some embodiments, operating the electric motor in the first direction comprises delivering electrical power to the electric motor; and ceasing operation of the electric motor in the first direction comprises ceasing delivery of electric power to the electric motor.

In some embodiments, the second signal corresponds to an angular speed value selected from a range of angular speed values; and operating the electric motor in the second direction based on the second signal comprises operating the electric motor to provide the angular speed value in the second direction.

In some embodiments, operating the electric motor in the second direction based on the second signal comprises determining that the second signal corresponds to a value exceeding a threshold value to disregard the first signal.

In some embodiments, operating the electric motor in the second direction based on the second signal comprises determining that the first signal is not being received from the first user input device.

In some embodiments, the watercraft comprises a jet propulsion system having a water intake, a nozzle and an impeller connected to the electric motor; operating the electric motor in the first direction causes the impeller to rotate in the first direction, drawing water in from the water intake and ejecting water from the nozzle; and operating the electric motor in the second direction causes the impeller to rotate in the second direction, drawing water in from the nozzle and ejecting water from the water intake.

Embodiments may include combinations of the above features.

In another aspect, the disclosure describes a watercraft comprising: an electric motor; a first user input device; a second user input device separate from the first user input device; and a controller connected to the electric motor, the first user input device and the second input device, the controller operable to perform the method described above.

In some embodiments, the first user device and second user device each comprise a respective lever operable through a range of positions.

In some embodiments, the watercraft can further have handlebars to steer the watercraft, the first user device and the second user device being disposed on the handlebars.

In some embodiments, the first user device is disposed on a first side of the handlebars and the second user device is disposed on a second side of the handle bars opposite the first side.

Embodiments may include combinations of the above features.

In a further aspect, the disclosure describes a method of controlling a watercraft, the watercraft comprising an electric motor, a first user input device and a second user input device separate from the first user input device, the method comprising: receiving a first signal from the first user input device; operating the electric motor in a first direction based on the first signal to propel the watercraft in a forward direction; receiving a second signal from the second user input device while receiving the first signal from the first user input device; and responsive to receiving the second signal, ceasing operation of the electric motor in the first direction.

In some embodiments, ceasing operation of the electric motor in the first direction comprises determining that the second signal corresponds to a value exceeding a threshold value to disregard the first signal.

In some embodiments, operating the electric motor in the first direction comprises delivering electrical power to the electric motor; and ceasing operation of the electric motor in the first direction comprises ceasing delivery of electric power to the electric motor.

Embodiments may include combinations of the above features.

In a further aspect, the disclosure describes a watercraft comprising: an electric motor; a first user input device; a second user input device separate from the first user input device; and a controller connected to the electric motor, the first user input device and the second input device, the controller operable to perform a method of controlling a watercraft, the method comprising: receiving a first signal from the first user input device; operating the electric motor in a first direction based on the first signal to propel the watercraft in a forward direction; receiving a second signal from the second user input device while receiving the first signal from the first user input device; and responsive to receiving the second signal, ceasing operation of the electric motor in the first direction.

Embodiments may include combinations of the above features.

In a further aspect, the disclosure describes a method of controlling a watercraft, the watercraft comprising a motor, a first user input device and a second user input device separate from the first user input device, the method comprising: receiving, from the first user input device, a first signal corresponding to a first value selected from a first range of values; operating the motor in a first direction, based on the first value, to propel the watercraft in a forward direction; receiving, from the second user input device, a second signal corresponding to a second value selected from a second range of values; and operating the motor in a second direction, based on the second value, to propel the watercraft in a reverse direction.

In some embodiments, the first value comprises a first angular speed value selected from a first range of angular speed values; and operating the motor in the first direction based on the first value comprises operating the motor to provide the first angular speed value in the first direction.

In some embodiments, the second value comprises a second angular speed value selected from a second range of angular speed values; and operating the motor in the second direction based on the second value comprises operating the motor to provide the second angular speed value in the second direction.

In some embodiments, the first range of angular speed values is different from the second range of angular speed values.

Embodiments may include combinations of the above features.

In a further aspect, the disclosure describes a watercraft comprising: a motor; a first user input device; a second user input device separate from the first user input device; and a controller connected to the motor, the first user input device and the second input device, the controller operable to perform a method of controlling the watercraft, the method comprising: receiving, from the first user input device, a first signal corresponding to a first value selected from a first range of values; operating the motor in a first direction, based on the first value, to propel the watercraft in a forward direction; receiving, from the second user input device, a second signal corresponding to a second value selected from a second range of values; and operating the motor in a second direction, based on the second value, to propel the watercraft in a reverse direction.

Embodiments may include combinations of the above features.

In a further aspect, the disclosure describes a watercraft comprising a forward-facing bow, a reverse-facing stern, a first side laterally opposite a second side, a straddle seat, a first handle on the first side, a second handle on the second side, a powertrain, a forward actuator at the first handle, a reverse actuator at the second handle, and a controller, the controller being operative to: control the powertrain to impart a forward-oriented force onto the personal watercraft when receiving a forward signal from the forward actuator, the forward-oriented force varying over a range of values based on the forward signal in accordance with a forward mode; and control the powertrain to impart a reverse-oriented force onto the personal watercraft when receiving a reverse signal from the reverse actuator, the reverse-oriented force varying over a range of values based on the reverse signal in accordance with a reverse mode.

In some embodiments, the powertrain has an electric motor directly coupled to an impeller of a jet pump, the jet pump further having a water intake forward of the impeller and a jet nozzle astern of the impeller, said control of the powertrain to impart a forward oriented force including operating the electric motor to rotate the impeller in a first angular orientation drawing water from the intake and out the jet nozzle, and said control of the powertrain to impart a reverse-oriented force includes operating the electric motor to rotate the impeller in a second angular orientation drawing water from the jet nozzle out the intake.

In some embodiments, the controller is further operative to switch from the forward mode to the reverse mode when the forward signal is below a forward threshold value and the reverse signal is above a reverse threshold value, and operative to switch from the reverse mode to the forward mode when the reverse signal is below a reverse threshold value and the forward signal is above a forward threshold value.

In some embodiments, switching from forward mode to reverse mode is contingent upon a motor speed being below a forward motor speed threshold value.

In some embodiments, switching from reverse mode to forward mode is contingent upon a motor speed being below a reverse motor speed threshold value In some embodiments, the controller is further operative to operate in the reverse mode when the forward signal is above a forward threshold value and the reverse signal is above a reverse threshold value.

In some embodiments, the control in the forward mode includes mapping a value of the forward signal to a corresponding forward-oriented force value based on a forward mode map and the control in the reverse mode includes mapping a value of the reverse signal to a corresponding reverse-oriented force value based on a reverse mode map.

In some embodiments, the forward mode map is different from the reverse mode map.

In some embodiments, the reverse mode map has a range of torque values which increases more aggressively as a function of the reverse signal than a corresponding range of torque values increasing as a function of the forward signal in the forward mode map.

In some embodiments, wherein switching between the forward mode and the reverse mode includes changing an indicator configuration in a user interface of the watercraft.

In some embodiments, wherein switching between the forward mode and the reverse involves moving a deflector gate into engagement with the jet nozzle for the reverse mode and moving the deflector gate out from engagement with the jet nozzle for the forward mode.

Embodiments may include combinations of the above features.

In a further aspect, the disclosure describes a method of controlling a powertrain of an electric watercraft, the personal watercraft further having a forward facing bow, a reverse facing stern, a first side laterally opposite a second side, a straddle seat, a first handle on the first side, and a second handle on the second side, the method comprising: receiving, at a controller, a forward signal from a forward actuator, the forward signal varying as a function of a variable position of a forward lever of the forward actuator, the forward lever located at the first handlebar; receiving, at the controller, a reverse signal from a reverse actuator, the reverse signal varying as a function of a variable position of a reverse lever of the reverse actuator, the reverse lever located at the second handlebar; the controller being operative to: impart a forward-oriented force onto the personal watercraft, via the powertrain, based on the forward signal, the forward-oriented force being variable over a range of different values as a function of the forward signal; and impart a reverse-oriented force onto the personal watercraft, via the powertrain, based on the reverse signal, the reverse-oriented force being variable over range of different values as a function of the reverse signal.

In some embodiments, the powertrain has an electric motor directly coupled to an impeller of a jet pump, the jet pump further having a water intake forward of the impeller and a jet nozzle astern of the impeller, said control of the powertrain to impart a forward oriented force including operating the electric motor to rotate the impeller in a first angular orientation drawing water from the intake and out the jet nozzle, and said control of the powertrain to impart a reverse-oriented force includes operating the electric motor to rotate the impeller in a second angular orientation drawing water from the jet nozzle out the intake.

In some embodiments, the controller is further operative to switch from the forward mode to the reverse mode when the forward signal is below a forward threshold value and the reverse signal is above a reverse threshold value, and operative to switch from the reverse mode to the forward mode when the reverse signal is below a reverse threshold value and the forward signal is above a forward threshold value.

In some embodiments, switching from forward mode to reverse mode is contingent upon a motor speed being below a forward motor speed threshold value.

In some embodiments, switching from reverse mode to forward mode is contingent upon a motor speed being below a reverse motor speed threshold value In some embodiments, the controller is further operative to operate in the reverse mode when the forward signal is above a forward threshold value and the reverse signal is above a reverse threshold value.

In some embodiments, the control in the forward mode includes mapping a value of the forward signal to a corresponding forward-oriented force value based on a forward mode map and the control in the reverse mode includes mapping a value of the reverse signal to a corresponding reverse-oriented force value based on a reverse mode map.

In some embodiments, the reverse mode map has a range of torque values which increases more aggressively as a function of the reverse signal than a corresponding range of torque values increasing as a function of the forward signal in the forward mode map.

Embodiments may include combinations of the above features.

In a further aspect, the disclosure describes a watercraft comprising a forward-facing bow, a reverse-facing stern, a first side laterally opposite a second side, a straddle seat, a first handle on the first side, a second handle on the second side, a powertrain having an electric motor directly coupled to an impeller of a jet pump, the jet pump further having a water intake forward of the impeller and a jet nozzle astern of the impeller and a controller, the controller being operative to: control the powertrain to impart a forward-oriented force onto the personal watercraft when receiving a forward signal in accordance with a forward mode, including operating the electric motor to rotate the impeller in a first angular orientation drawing water from the intake and out the jet nozzle; and control the powertrain to impart a reverse-oriented force onto the personal watercraft when receiving a reverse signal in accordance with a reverse mode, including operating the electric motor to rotate the impeller in a second angular orientation drawing water from the jet nozzle out the intake.

Embodiments may include combinations of the above features.

Many further features and combinations thereof concerning the present improvements will appear to those skilled in the art following a reading of the instant disclosure.

DESCRIPTION OF THE FIGURES

In the figures.

DETAILED DESCRIPTION

The following disclosure relates, in part, to watercraft and associated methods for operating watercraft. The watercraft have a powertrain for effecting propulsion in both a forward direction and a reverse direction. The powertrain may comprise an electric motor driving a jet propulsion system (or jet pump) to effect propulsion. The disclosure herein may be applicable to powersport vehicles such as personal watercraft (PWCs), for example. In some embodiments, the watercraft and methods described herein may control an electric motor to operate in a forward mode or a reverse mode. In the forward mode, the electric motor may drive the impeller of a jet pump in a manner to draw water through an intake and expel the water out of a jet nozzle. In the reverse mode, the electric motor may drive the impeller in the opposite orientation and draw water in from the jet nozzle and expel the water out of the intake. In an alternate embodiment, a deflector or gate may be selectively positioned out from interference with the jet stream and into interference with the jet stream to switch between the forward mode and reverse mode. In some embodiments, the watercraft and methods described herein may, based on one or more positions of a forward lever of a forward input device (e.g., a forward accelerator or forward throttle), and of a reverse lever of a reverse input device (e.g., a reverse accelerator, reverse throttle or brake), both operatively connected to a controller of an electric motor, determine the direction of propulsion for the vehicle (e.g., forward or reverse) and an amplitude of the propulsion.

The terms "connected", "connects" and "coupled to" may include both direct connection and coupling (in which two elements contact each other) and indirect connection and coupling (in which at least one additional element is located between the two elements).

At least part of the following disclosure relates to electric watercraft, but could also be applicable to combustion engine or hybrid (electric and combustion) watercraft. Examples of suitable electric watercraft include personal watercraft (PWC) having a straddle seat for accommodating an operator and optionally one or more passengers.

Figure 1:
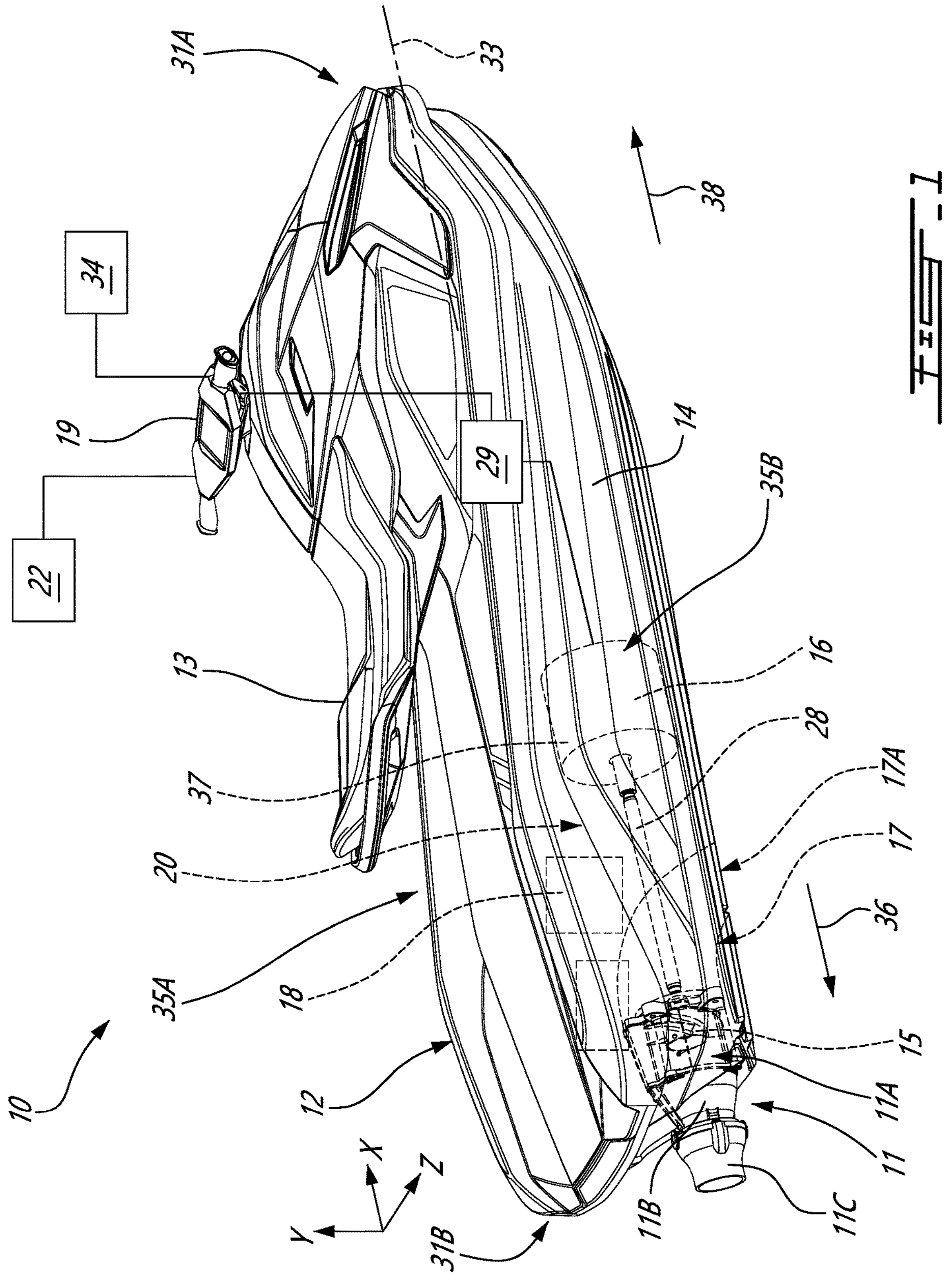
FIG. 1 is a perspective view of an example of a watercraft.

FIG. 1 illustrates an example embodiment of a watercraft 10 of a type preferably used for transporting one or more passengers over a body of water. The watercraft 10 can therefore be referred to herein as a "personal watercraft 10" or "PWC 10". The PWC 10 of FIG. 1 is electrically powered and can therefore be referred to as an electric watercraft. An upper portion of the PWC 10 is formed of a deck 12 including a straddle seat 13 for accommodating a driver of the PWC 10 and optionally one or more passengers. A lower portion of the PWC 10 is formed of a hull 14 which sits in the water. The hull 14 and the deck 12 enclose an interior volume 37 of the PWC 10 which provides buoyancy to the PWC 10 and houses some components thereof. A non-limiting list of components of the PWC 10 that may be located in the interior volume 37 include an electric motor 16, one or more electric batteries 18 and other components for an electric powertrain 20 of the PWC 10 such as a driveshaft 28. The hull 14 may also include external strakes and chines which provide, at least in part, riding and handling characteristics of the PWC 10. The interior volume 37 may also include any other components suitable for use with PWC 10, such as storage compartments, for example.

The PWC 10 includes a jet propulsion system 11 to create a pressurized jet of water which provides thrust to propel the PWC 10 through the water. The jet propulsion system 11 includes a rotatable impeller 15 disposed in the water to draw water through a water intake 17 on an underside of the hull 14, with the water being directed to a jet pump 11A. The water intake 17 is a passage formed by walls of the hull 14, and extends downstream from an opening in the underside of the hull 14 to an upright, rear wall 14A. The jet pump 11A has an inlet fluidly connected to the water intake 17 at the rear wall 14A. Water ejected from the jet pump 11A is directed through a venturi 11B which further accelerates the water to provide additional thrust. The accelerated water jet is ejected from the venturi 11B via a pivoting steering nozzle 11C which is directionally controlled by the driver with a steering mechanism 19 to provide a directionally controlled jet of water to propel and steer the PWC 10. In the illustrated embodiment, the steering mechanism 19 includes handlebars.

The electric powertrain 20 of the PWC 10 includes one or more of the electric motors 16 (referred hereinafter in the singular) drivingly coupled to the impeller 15 via the drive shaft 28. The drive shaft 28 transfers motive power from the electric motor 16 to the impeller 15. The electric powertrain 20 also includes the batteries 18 (referred hereinafter in the singular) for providing electric current to the electric motor 16 and driving the electric motor 16. In some embodiments, the battery 18 may be a lithium ion or other type of battery 18. In various embodiments, the electric motor 16 may be a permanent magnet synchronous motor or a brushless direct current motor, for example. In an embodiment, the powertrain 20 is non-electric or only partially electric, such that the powertrain 20 is or includes a combustion powertrain including an internal combustion engine and fuel tank, for example. As discussed elsewhere herein, the operation of the electric motor 16 and the delivery of drive current to the electric motor 16 may be controlled by a controller 29 based on an actuation by the user of a forward input device 34 and/or a reverse input device 22 on the steering mechanism 19, among other inputs.

The PWC 10 moves along an aft or reverse direction of travel 36 and along a forward direction of travel 38. The forward direction of travel 38 is the direction along which the PWC 10 travels in most instances when displacing. The reverse direction of travel 36 is the direction along which the PWC 10 displaces only occasionally, such as when it is backing up. The PWC 10 includes a bow 31A and a stern 31B defined with respect to the reverse and forward directions of travel 36,38, in that the bow 31A is positioned ahead of the stern 31B relative to the forward direction of travel 38, and that the stern 31B is positioned astern of the bow 31A relative to the reverse direction of travel 36. The PWC 10 defines a longitudinal center axis 33 that extends between the bow 31A and the stern 31B. A port side 35A and a starboard side 35B of the PWC 10 are defined on opposite lateral sides of the center axis 33. The port side 35A and the starboard side 35B may interchangeably be referred to as a first side and as a second side, for instance. The positional descriptors "front", "aft" and "rear" and terms related thereto are used in the present disclosure to describe the relative position of components of the PWC 10. For example, if a first component of the PWC 10 is described herein as being in front of, or forward of, a second component, the first component is closer to the bow 31A than the second component. Similarly, if a first component of the PWC 10 is described herein as being aft of, or rearward of, a second component, the first component is closer to the stern 31B than the second component. The PWC 10 also includes a three-axes frame of reference that is displaceable with the PWC 10, where the Y-axis is parallel to the vertical direction, the X axis is parallel to the center axis 33, and the Z-axis is perpendicular to both the X and Y axes and defines a lateral direction between the port and starboard sides 35A, 35B. Features and components are described and shown in the present disclosure in relation to the PWC 10, but the present disclosure may also be applied to different types of PWC 10, such as other boats or other vessels, used to transport people and/or cargo.

PWC 10 may include a forward input device 34 configured for generating a variable forward signal based on user activation, and a separate, distinct reverse input device 22 configured for generating a variable reverse signal based on user activation. The forward input device 34 may also be referred to as a forward actuator, forward accelerator or forward throttle. Similarly, the reverse input device 22 may be referred to as a reverse actuator, reverse accelerator or a reverse throttle. The forward input device 34 and the reverse input device 22 may be operable by a user (e.g., a driver) of the PWC 10 to control the PWC 10. The forward input device 34 and the reverse input device 22 may be spaced apart on the steering mechanism 19 such that a user can operate each input device using different hands. For example, the forward input device 34 may have a forward lever or rotatable handle at a first side of the handlebar, whereas the reverse input device 22 may have a reverse lever or rotatable handle at a second side of the handlebar. The forward input device 34 and the reverse input device 22 may be pivotable, movable or otherwise operable through a range of positions to generate corresponding forward and reverse signals, respectively. For example, the forward signal may have a value which varies as a function of the position of a lever or rotatable handle on the forward input device 34. In this way, the user selected position of the lever or rotatable handle may correspond to a particular value selected from a range of values associated with forward propulsion of the PWC 10. Similar comments apply to the reverse input device. The reverse signal can have a value which varies as a function of the position of a lever or rotatable handle on the reverse input device 22, and the user selected position of the lever or rotatable handle may correspond to a particular value selected from a range of values associated with reverse propulsion of the PWC 10. This reverse propulsion may cause braking and/or movement in the reverse direction of travel 36 for the PWC 10. Having the reverse input device 22 that provides braking and reverse functionality being separate from the forward input device 34 that provides forward acceleration may provide a more intuitive and convenient user interface for an operator of the PWC 10.

The controller 29 can be configured for receiving both the forward signal and the reverse signal. The controller 29 may include more than one control unit communicatively coupled to one another, one or more of which may be a computer. The operation of motor 16 may be controlled by the controller 29 based on the forward and reverse signals. The forward signal and/or the reverse signal may be considered a throttle signal. The controller 29 may have a function to map an amplitude of a throttle signal (either forward or reverse) to a power request for the electric motor 16 and to control the electric motor 16 based on the power request. The power request may be an angular speed request or a torque request, for example. In some embodiments, the forward input device 34 may be mapped to angular speed (e.g., revolutions per minute (RPM)) of the electric motor 16. A particular position of a lever on the forward input device 34 may produce a forward signal that indicates a particular RPM value of a range of RPM values for the electric motor 16. In other embodiments, the forward input device 34 may be mapped to output torque of the electric motor 16. A particular position of a lever on the forward input device 34 may produce a forward signal that indicates a particular torque of a range of torque values. Similar comments apply to the reverse input device 22 and the reverse signal.

The mapping of the amplitude or value of the throttle signal to the power request may be subject to a current operating mode of the controller 29 (e.g., a power-saving mode, a normal mode or a high-performance mode). PWC 10 may further include one or more sensors 24 (see FIG. 5) for sensing one or more operating parameters of PWC 10. Such operating parameters can be associated to control conditions at the controller 29, and as such, the power request communicated to the electric motor 16 may further be based on feedback from one or more sensors 24. It should also be noted that the mapping to a power request may be different for the forward input device 34 and for the reverse input device 22. In other words, the range of angular speed values or torque values selectable using the forward input device 34 may be different than the range of angular speed values or torque values selectable using the reverse input device 22.

Figure 2A:
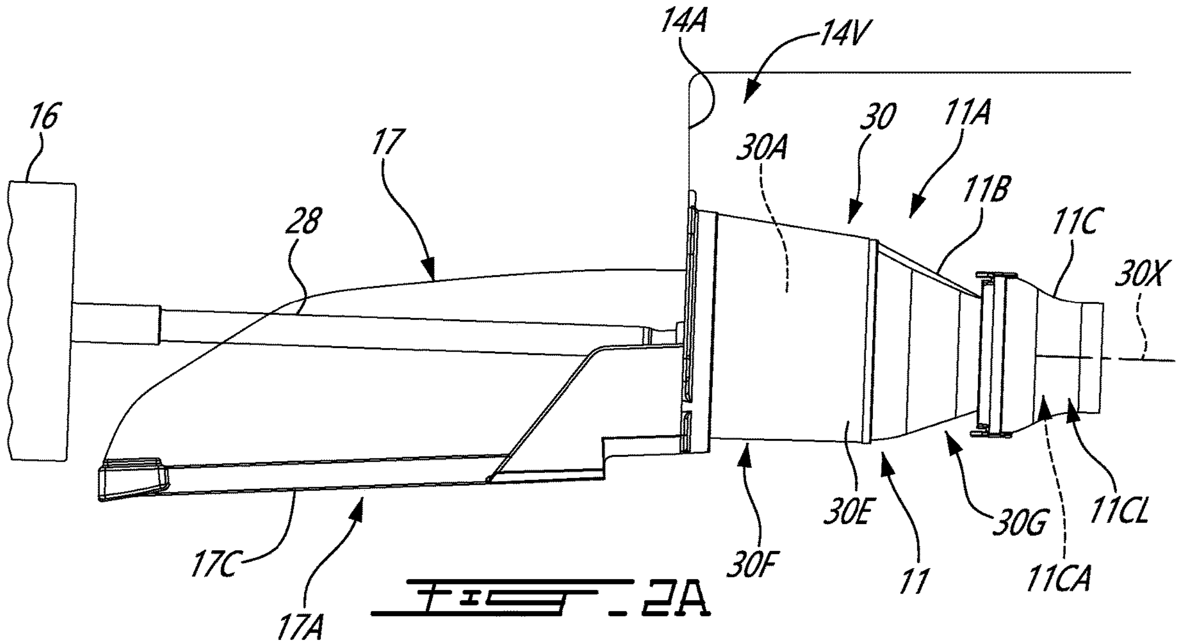
FIGS. 2A and 2B are a side plan view and an perspective view, respectively, of a jet propulsion system of the watercraft of FIG. 1.
Figure 2B:
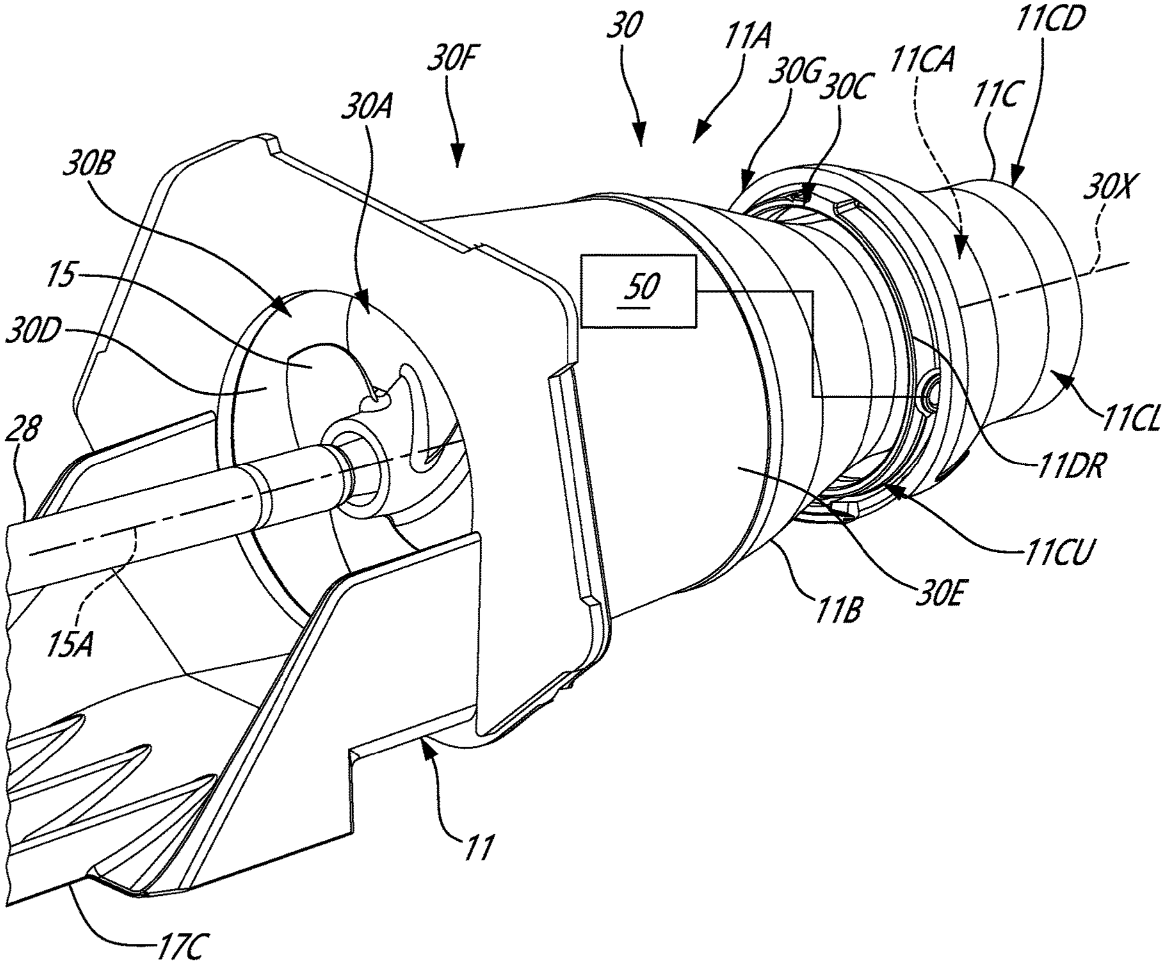

Referring to FIGS. 2A and 2B, the jet propulsion system 11 includes at least the water intake 17 and the jet pump 11A. The jet pump 11A includes the impeller 15, stator vanes, the venturi 11B (sometimes referred to as a nozzle) and the pivoting steering nozzle 11C. The jet pump 11A has, or is formed by, a housing 30 (sometimes referred to in this specification as the "jet pump housing"). The housing 30 is a hollow body which delimits a housing interior 30A or cavity. The housing interior 30A contains the impeller 15 and the stator vanes. In some embodiments, the housing 30 forms the venturi 11B. Alternatively, the venturi 11B may be a component separate from the housing 30. The housing 30 is an elongated body which extends between an inlet 30B through which the water enters the interior 30A via the water intake 17, and an outlet 30C through which the water is expelled from the housing interior 30A by the impeller 15. The inlet 30B of the housing 30 is in fluid communication, or coincident, with the water intake outlet 17B of the water intake 17. The housing 30 is a stationary component whose position with respect to the hull 14 is fixed, and which moves with the PWC 10 through the water. The housing 30 is fixed in position by being mounted to the internal rear wall 14A of the hull 14 within a jet pump tunnel 14V formed along an underside of the hull 14. Some or all of the housing 30 may be partly or completely submerged in water during one or more operating phases of the PWC 10. For example, when the PWC 10 is floating in the water or travelling at relatively low speeds through the water in the forward direction, some or all of the housing 30 may be partly or completely submerged in the water. The water intake 17 is in the form of a ramping conduit which extends from a water intake inlet 17A at the opening in the underside of the hull 14, to a water intake outlet 17B at the internal rear wall 14A. The water intake inlet 17A is covered by a grate 17C or other body to prevent the ingress of debris into the water intake 17.

The housing interior 30A of the housing 30 is delimited by an inner wall 30D. In the example illustrated embodiment where the housing 30 is an annular body that defines a housing center axis 30X, the inner wall 30D is an annular body with a circumferential surface. The inner wall 30D (sometimes referred to as a "wear ring") may be a component which experiences wear and which may be replaced. The housing 30 has an outer wall 30E that is spaced radially outwardly from the inner wall 30D. The outer wall 30E defines the external surface of the housing 30 and may be submerged in water during one or more operating phases of the PWC 10, such as when the PWC 10 is floating or travelling at relatively low forward speeds. Thus, both the inner wall 30D and the outer wall 30E are configured to be exposed to water during one or more operating phases of the PWC 10. More specifically, the water may flow through the housing interior 30A and thus along or against the inner wall 30D when the PWC 10 is being used, and the outer wall 30E may be partly or completely submerged in water when the PWC 10 is being used. A thickness of the housing 30 may be defined as the distance separating the inner wall 30D from the outer wall 30E, when measured along a line that is normal to aligned surfaces of the inner and outer walls 30D,30E, or when measured along a line that is radial to the housing center axis 30X of the cylindrical housing 30.

The housing 30 encloses or houses the impeller 15 and other components such as stator vanes. The impeller 15 is positioned within the housing interior 30A and is rotatable about an impeller axis to pressurize the water and convey it through the housing 30. The impeller axis is coaxial with the housing center axis 30X. The rotation of the impeller 15 functions to draw the water into the housing interior 30A via the inlet 30B and to expel the water from the outlet 30C, when the PWC 10 is travelling in the forward direction. When travelling in the reverse direction, the rotation of the impeller 15 functions to draw the water into the housing interior 30A via the outlet 30C and expel the water from the inlet 30B. Referring to FIG. 2B, the impeller 15 is positioned axially between the inlet 30B and the outlet 30C of the housing 30, relative to the impeller axis 15A and the housing center axis 30X. The impeller 15 may be positioned elsewhere with respect to the inlet and outlet 30B,30C. For example, in an alternate embodiment, the impeller 15 is positioned at the inlet 30B. In another possible embodiment, the impeller 15 is positioned at the outlet 30C.

Referring to FIGS. 2A and 2B, the housing 30 includes an upstream portion 30F and a downstream portion 30G. When the powertrain imparts a forward-oriented force onto the PWC 10, the water flows through the housing interior 30A of the housing 30 from the upstream portion 30F to the downstream portion 30G. When the powertrain imparts a reverse-oriented force onto the PWC 10 (e.g., by reversing the rotational direction of the impeller 15), the water flows through the housing interior 30A of the housing 30 from the downstream portion 30G to the upstream portion 30F. In an embodiment, an example of which is shown in FIGS. 2A and 2B, the upstream and downstream portions 30G,30F are integral with one another and form a one-piece or monolithic housing 30. In an alternate embodiment, the upstream portion 30F is mounted to the downstream portion 30G, such that the upstream and downstream portions 30G,30F form two separate components which make up the housing 30. The inlet 30B of the housing 30 is defined in the upstream portion 30F, and the outlet 30C is defined in the downstream portion 30G. Referring to FIGS. 2A and 2B, the upstream portion 30F has an internal diameter which remains substantially constant along a length of the upstream portion 30F defined along the housing center axis 30X. Referring to FIGS. 2A and 2B, the downstream portion 30G has an internal diameter which decreases along a length of the downstream portion 30G defined along the housing center axis 30X, such that the downstream portion 30G narrows in diameter or converges toward the outlet 30C. The downstream portion 30C thus forms the venturi 11B. Referring to FIGS. 2A and 2B, the housing 30 forms or defines a volume or body which narrows along its axial length from the inlet 30B to the outlet 30C. Other shapes for the upstream and downstream portions 30F,30G are possible.

Referring to FIG. 2B, the pivoting steering nozzle 11C (sometimes referred to herein simply as the "steering nozzle 11C") is a hollow annular body which defines a nozzle center axis 11CX and delimits a nozzle interior 11CA or cavity. The water expelled from the outlet 30C of the housing 30 is received in the nozzle interior 11CA via the outlet 30C of the housing 30. The annular body of the steering nozzle 11C includes an upper portion 11CP and a lower portion 11CL positioned beneath the upper portion 11CP. Referring to FIGS. 2A and 2B, the upper and lower portions 11CP,11CL are upper and lower halves of the steering nozzle 11C, respectively, which form a semi-cylindrical shape. In an embodiment, the upper portion 11CP is defined above a horizontal plane including the nozzle center axis 11CX, and the lower portion 11CL is defined beneath the horizontal plane including the nozzle center axis 11CX. The steering nozzle 11C is an elongated body which extends axially along the nozzle center axis 11CX between an upstream end 11CU and a downstream end 11CD positioned astern of the upstream end 11CU. Referring to FIG. 2B, the steering nozzle 11C is pivotably mounted to the housing 30 adjacent to the outlet 30C of the housing 30. The steering nozzle 11C is pivotably mounted to the housing 30 and is positioned at least partially downstream of the outlet 30C. By "at least partially downstream", it is understood that some or all of the steering nozzle 11C is located more astern than the outlet 30C of the housing 30. For example, and referring to FIG. 2B, the upstream end 11CU of the steering nozzle 11C is located forward of the outlet 30C and the downstream end 11CD is located astern of the outlet 30C. In an alternate embodiment, all of the axial length of the steering nozzle 11C measured between the upstream and downstream ends 11CU,11CD is astern of the outlet 30C. In an alternate embodiment, the steering nozzle 11C is spaced axially apart from the outlet 30C of the housing 30, such that there is at least one other component positioned axially between the outlet 30C and the steering nozzle 11C.

The steering nozzle 11C is configured to pivot relative to the housing 30 in order to directionally control the jet of water expelled from the downstream end 11CD of the steering nozzle 11C, and thus propel and steer the PWC 10. One possible pivoting movement of the steering nozzle 11C allows for adjusting a "trim" of the steering nozzle 11C. The trim of the steering nozzle 11C refers to the vertical angle formed between the nozzle center axis 11CX and the housing center axis 30X. The trim of the steering nozzle 11C may be adjusted by pivoting the steering nozzle 11C vertically relative to the housing 30 about a pivot axis that is substantially horizontal and transverse to the housing center axis 30X. The trim movement of the steering nozzle 11C allows for directionally orienting the jet of water expelled from the downstream end 11CD of the steering nozzle 11C upward or downward, thereby adjusting the running angle of the PWC 10. For example, trimming the steering nozzle 11C upward (i.e. orienting the downstream end 11CD upward) helps to push the bow 31A of the PWC 10 upward and allows for the PWC 10 to travel faster. Conversely, trimming the steering nozzle 11C downward (i.e. orienting the downstream end 11CD downward) helps to push the bow 31A of the PWC 10 into the water which may allow for better navigation of the PWC 10. In an embodiment, the steering mechanism 19 includes a dedicated trim input, which is configured to send a trimming signal to the controller 29 of the PWC 10 to trim the steering nozzle 11C. In an embodiment, the steering mechanism 19 is free of a dedicated trim input, such that the steering nozzle 11C is trimmed automatically in response to another operator input, or in response to an operating mode of the PWC 10.

Another possible pivoting movement of the steering nozzle 11C allows for steering the PWC 10. In this steering pivoting movement, the steering nozzle 11C pivots horizontally relative to the housing 30 about a pivot axis that is substantially upright and transverse to the housing center axis 30X. The lateral movement of the steering nozzle 11C allows for directionally orienting the jet of water expelled from the downstream end 11CD of the steering nozzle 11C toward the port side 35A or toward the starboard side 35B, thereby allowing the PWC 10 to be steered toward the left or the right. In an embodiment, an example of which is shown in FIGS. 2A and 2B, the steering nozzle 11C is capable of both trim and steering pivoting movement.

Various mechanisms are possible to allow the steering nozzle 11C to pivot relative to the housing 30. One example of such a mechanism is shown in FIGS. 2A and 2B. The jet propulsion assembly 11 includes a pivot ring 11DR that is mounted to the steering nozzle 11C. Referring to FIG. 2B, the pivot ring 11DR is positioned at the upstream end 11CU of the steering nozzle 11C. Referring to FIG. 2B, the pivot ring 11DR is positioned at a similar axial position as the outlet 30C of the housing 30. The pivot ring 11DR is displaceable in order to cause pivoting displacement of the steering nozzle 11C to provide the directionally controlled jet of water to propel and steer the PWC 10. The pivot ring 11DR may sometimes be referred to as a "trim" ring because it allows for adjusting the trim of the steering nozzle 11C. The pivot/trim ring 11DR may also facilitate the lateral pivoting movement of the steering nozzle 11C to achieve steering, as described above. The jet propulsion assembly 11 includes one or more actuator(s) 50 which are configured to exert a force against the pivot ring 11DR so that the pivot ring 11DR can pivotably displace the steering nozzle 11C. The one or more actuator(s) 50 (occasionally referred to herein in the singular for convenience) is shown schematically in FIG. 2B, and can include any suitable configuration. For example, the actuator 50 may be a linear actuator which exerts a force against the pivot ring 11DR along a linear direction. Alternatively, the actuator 50 may output a rotational drive to the pivot ring 11DR. The actuator 50 may be connected directly or indirectly to the pivot ring 11DR, and may include gearing or other force-transferring bodies. The actuator 50 may be an electric, hydraulic or pneumatic force-exerting device.

It may sometimes be desirable to cause the PWC 10 to reverse, i.e. to cause the PWC 10 to travel in the reverse direction of travel 36, such as for maneuvering around the trailer or the dock. Moreover, although the PWC 10 may slow down significantly when not subjected to a forward oriented force (i.e. when not actively propelled by the powertrain in the forward direction of travel 38), due to hydrodynamics, it may also be desirable to actively impart a reverse force to the PWC 10 as it moves in the forward direction of travel 38 to actively decelerate (brake) the PWC 10, over and above the passive deceleration which may occur due to the resistance of the water.

One possible technique for achieving these functions, in embodiments with a powertrain having an electric motor, involves reversing the direction of rotation of the impeller 15 about the impeller axis so as to reverse the flow of water through the steering nozzle 11C and through the housing 30 (i.e. the water flows from the downstream end 11CD of the steering nozzle 11C to the inlet 30B of the housing 30). This reversal of flow through the jet propulsion system 11 will cause the PWC 10 to move in the reverse direction of travel 36 and/or will cause the PWC travelling in the forward direction of travel 38 to slow down.

Another possible technique for causing the PWC 10 to reverse and to respond to controlled braking involves maintaining the normal direction of water flowing through the housing 30 and nozzle 11C (i.e. the water flows from the inlet 30B of the housing 30 to the downstream end 11CD of the steering nozzle 11C) and intercepting or engaging this flow with another component of the jet propulsion system 11. This component of the jet propulsion system 11 may be referred to herein as a deflector gate or reverse bucket and can be present on watercraft having powertrains involving either electric motors or internal combustion engines.

Figure 3:
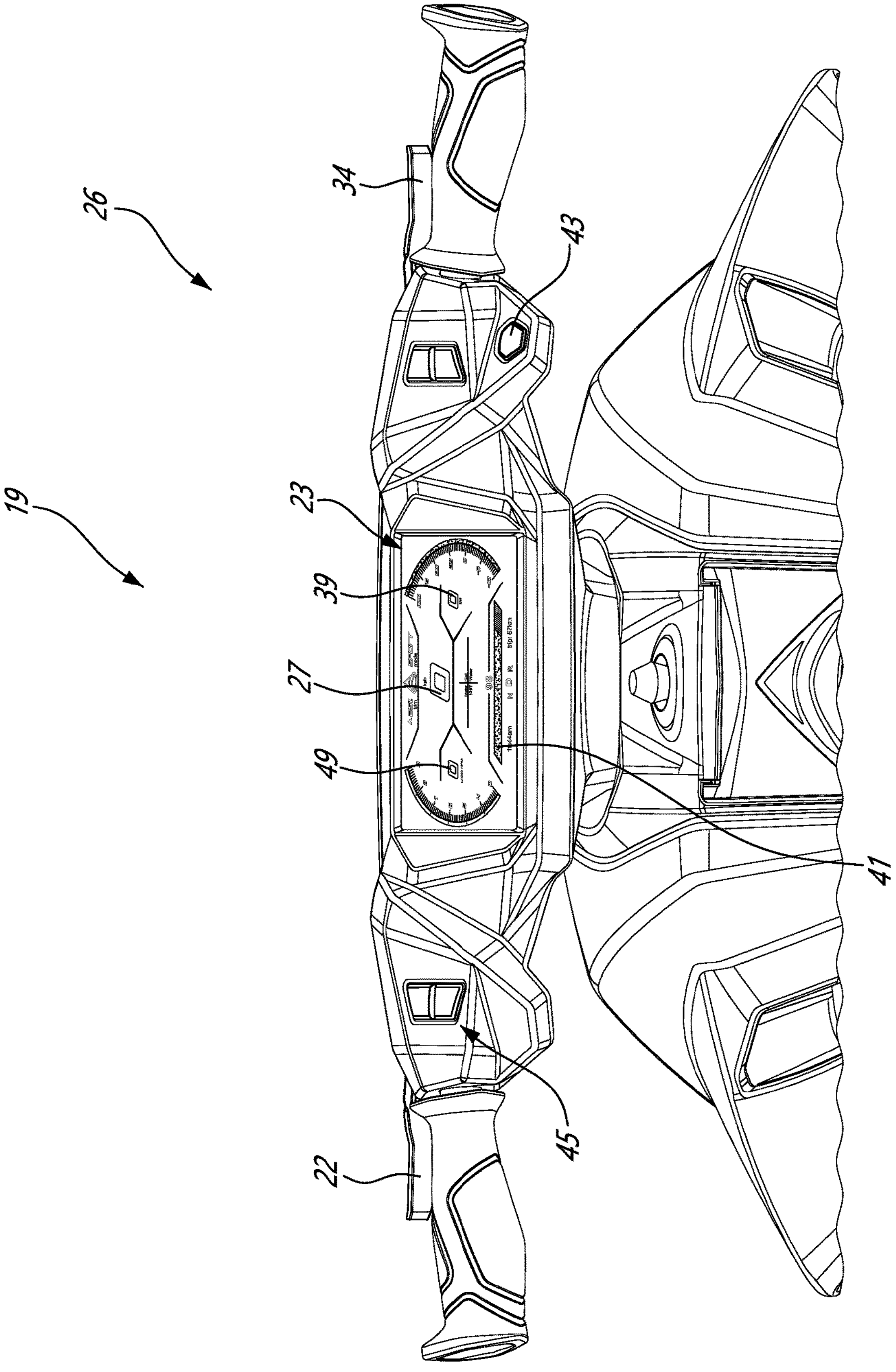
FIG. 3 is a rear view of a user interface of the watercraft of FIG. 1.

Referring now to FIG. 3, the PWC 10 may include a user interface 26 which can include one or more buttons 45, 43 (e.g. a button cluster), and one or more visual indicators 41, 49, 27, 39. In the illustrated example, the user interface 26 is provided on the steering mechanism 19; however, other implementations of a user interface are also contemplated. The visual indicators 41, 49, 27, 39 may be embodied in physical devices such as needle indicators, gauges, dials and digital readouts, and/or as virtual devices such as virtual needle indicator, gauges, dials, and digital readouts represented as corresponding elements of a graphical user interface 23 such as a display screen or touch screen. The buttons 45, 43 can be embodied as physical (hardware) devices such as movable press buttons in a button cluster which trigger electrical contacts, or as virtual devices involving both hardware and software, such as portions of a touch screen delimited by graphical elements displayed when the screen is powered. The user interface 26 may include a liquid crystal display (LCD) screen, thin-film-transistor (TFT) LCD screen, light-emitting diode (LED), a button cluster, or other suitable display device operatively connected to the controller 29 and/or to one or more other systems of the PWC 10.

FIG. 3 shows the forward input device 34 and the reverse input device 22 positioned on different handles of the steering mechanism 19. The forward input device 34 may be moved, actuated, manipulated or otherwise operated by a driver's right hand, whereas the reverse input device 22 may be moved, actuated, manipulated or otherwise operated by a driver's left hand. In this way, a driver may simultaneously operate the forward input device 34 and the reverse input device 22 to generate forward signals and reverse signals at the same time. Systems and methods for managing the simultaneous generation of forward and reverse signals are discussed in further detail elsewhere herein. The illustrated example shows the forward input device 34 and the reverse input device 22 each including a similar lever that may be pivoted by a user. In other embodiments, the forward input device 34 and the reverse input device 22 may include distinct devices. For example, the reverse input device 22 may include a lever similar to a brake lever facing the bow 31A that is operated using the fingers of a user, whereas the forward input device 34 may include a lever facing the stern 31B that is operated using the thumb of a user or include a rotatable handle that is rotated by the hand of a user. Further, one or both of the forward input device 34 and the reverse input device 22 need not always be implemented on the steering mechanism 19, and may instead be implemented using a foot pedal, for example.

In an embodiment, the user interface 26 can include a graphical user interface 23 displayed on a display screen such as presented in FIG. 3. The graphical user interface 23 can be configured for displaying some or all of the values measured by sensors to a user. The graphical user interface may include the visual indicator 27 showing a current speed of the PWC 10 (e.g., a speedometer). In this embodiment, the visual indicator 27 is embodied as a digital readout. The graphical user interface 23 can further include the visual indicator 49 indicating a current angular rotation speed of the electric motor 16 (herein after referred to as motor speed) in revolutions-per-minute (RPM) (e.g., a tachometer), including in an embodiment both a digital readout and a virtual dial, the visual indicator 39 indicating an amount of power or torque being generated by a powertrain of PWC 10 (e.g., a power meter), including in an embodiment both a digital readout and a virtual dial, a the visual indicator 41 associated with state of charge (SoC) of the battery 18 (e.g., an SOC indicator), and/or other indicators such as analog or digital readouts, based on corresponding sensors. In particular, controller operating mode indicators (e.g. "Eco", "Normal" and "Sport") can be provided in this example at a top portion of the display screen, and controller mode (e.g. Drive "D", Neutral "N", Reverse "R") indicator can be provided at a bottom portion of the display screen. One or more of the elements of the graphical user interface 23 can have variable colors. The controller can be said to change an indicator configuration of the user interface 26 when changing either one, or more than one of the operating mode indicator, a controller mode indicator, and/or a variable color of one or more elements of the graphical user interface 23.

In an embodiment, the button 45 is disposed on a left handlebar adjacent the reverse input device 22 and the button 43 is disposed on a right handlebar adjacent the forward input device 34. The buttons 45, 43 may be provided to allow a user to change between controller operating modes such as driving modes (e.g., a power saving mode, a normal mode or a high-performance mode), activate an emergency stop, and/or any other suitable function such as headlights activation. Changes stemming from user input can be reflected in corresponding portions of the graphical user interface 23. In an embodiment, the user interface 26 further includes an audible indicator including a speaker.

Figure 4:
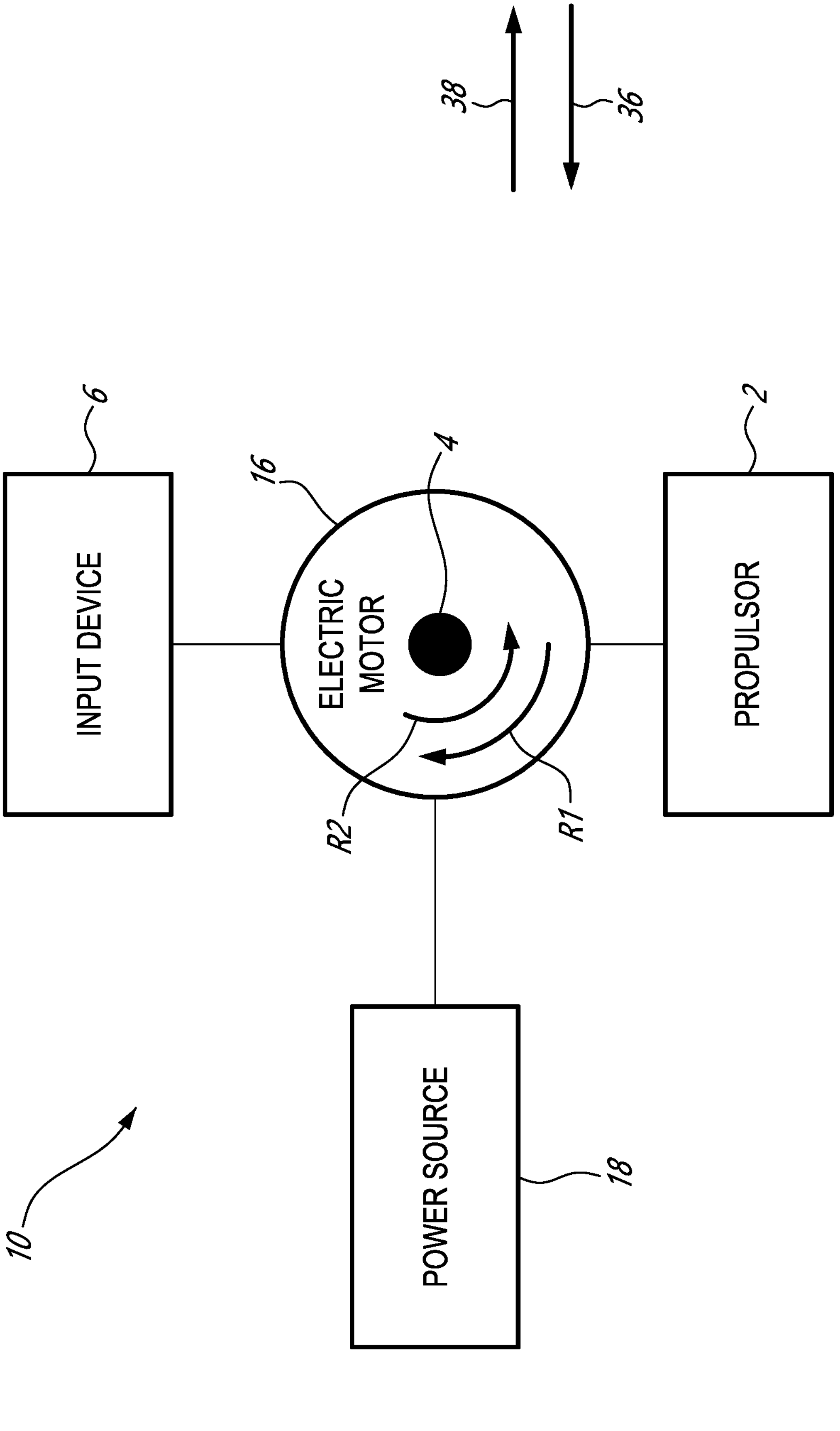
FIG. 4 is a schematic representation of the watercraft of FIG. 1.

Referring to FIG. 4, a schematic diagram of components of PWC 10 is shown. The PWC 10 has a propulsor 2 (e.g., the jet propulsion system 11). At least one electric motor 16 is drivingly engaged to the propulsor 2 and operatively connectable to the battery 18. At least one input device 6 (e.g. the forward input device 34 and/or the reverse input device 22) is operatively connected to the electric motor 16. The electric motor 16 has a forward mode in which a motor output 4 (e.g. a rotor) of the electric motor 16 rotates in a first direction R1. The electric motor 16 has a reverse mode in which the motor output 4 of the electric motor 16 rotates in a second direction R2 opposite the first direction R1. The input device 6 is engageable to operate the electric motor 16 in a selected one of the forward mode and the reverse mode. Further, the input device 6 may enable the selection of the speed, torque and/or power at which the electric motor 16 operates. In the forward mode, the motor output 4 of the electric motor 16 engages the propulsor 2 in such a way that the propulsor 2 propels the PWC 10 in the forward direction 38. In the reverse mode, the motor output 4 of the electric motor 16 engages the propulsor 2 in such a way that the propulsor 2 propels PWC 10 in the reverse direction 36 opposite the forward direction 38 (also represented relative the PWC 10 in FIG. 1).

Figure 5:
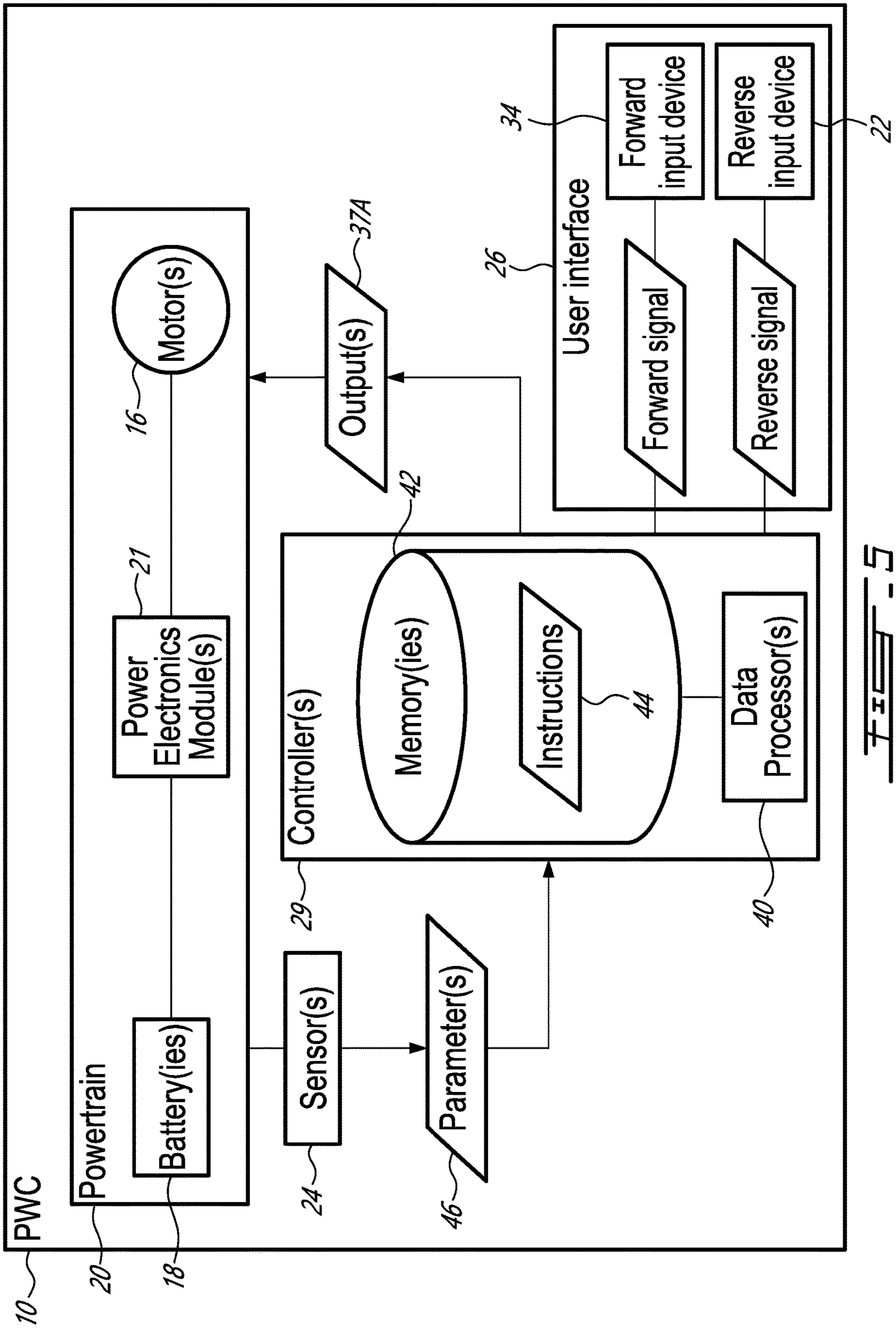
FIG. 5 is another schematic representation of the watercraft of FIG. 1.

FIG. 5 is another schematic representation of PWC 10. The electric motor 16 may provide propulsive power to PWC 10 and may be part of the powertrain 20 of PWC 10. The operation of the electric motor 16 and the delivery of electric power from the battery 18 to the electric motor 16 may be controlled by the controller 29 via output(s) 37A and power electronics module 21 (referred hereinafter as "PEM 21"). The PEM 21 may include suitable electronic switches (e.g., insulated gate bipolar transistor(s)) to provide the electric motor 16 with electric power having the desired voltage, current, waveform, etc. to implement the desired performance of the PWC 10 based on an actuation of the forward input device 34 or reverse input device 22 by the user to indicate a command to propel PWC 10. In some embodiments, the PEM 21 may include a power inverter for example.

One or more of sensors 34 may be operatively connected to component(s) of the powertrain 20 and configured to sense one or more parameters 46 of the powertrain 20. The controller 29, via the control of the PEM 21 and using feedback from the sensor(s) 24, may control the amount of motive power that may be output from the powertrain 20 during propulsion of PWC 10, and also control the amount of electric power that may be delivered to the battery 18 during regenerative braking. The controller 29 may include one or more data processors 40 (referred hereinafter as "processor 40") and non-transitory machine-readable memory 42. The controller 29 may be operatively connected to the sensor(s) 24 via wired or wireless connections, for example, so that one or more parameters 46 acquired via the sensor(s) 24 may be received at the controller 29 and used by the processor 40 in one or more procedures or steps defined by machine-readable instructions 44 stored in the memory 42 and executable by the processor 40.

The controller 29 may carry out additional functions than those described herein. The processor 40 may include any suitable device(s) configured to cause a series of steps to be performed by the controller 29 so as to implement a computer-implemented process such that the instructions 44, when executed by the controller 29, may cause the functions/acts to be executed. Th processor 40 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

The memory 42 may include any suitable machine-readable storage medium. The memory 42 may include non-transitory computer readable storage medium such as, for example, but not limited to, an electronic, magnetic, optical, electromagnetic, infrared, or semiconductor system, apparatus, or device, or any suitable combination of the foregoing. The memory 42 may include a suitable combination of any type of machine-readable memory that is located either internally or externally to the controller 29. The memory 42 may include any storage means (e.g. devices) suitable for retrievably storing machine-readable instructions executable by the processor 40.

The sensor(s) 24 may include one or more current sensors and/or one or more voltage sensors operatively connected to the battery 18 and/or operatively connected to the PEM 21. The sensor(s) 24 may include a position sensor (e.g., encoder) operatively coupled to the motor 16 to measure a position and/or rotational speed of a rotor of the motor 16. The sensor(s) 24 may include a motor speed sensor (e.g., revolution counter) operatively coupled to the motor 16 to measure the rotational speed of the motor 16 and generate a speed signal indicative of a current rotation speed of the electric motor as it changes over time. The sensor(s) 24 may include a torque sensor operatively coupled to the motor 16 to measure an output torque of motor 16. Alternatively, the output torque of the motor 16 may be inferred by the controller 29 based on an amount of electric current being delivered to the motor 16. The sensor(s) 24 may include one or more temperature sensors such as one or more thermocouples or resistance temperature detectors (RTD) suitable for measuring a temperature of one or more cells of the battery 18, and/or for measuring a temperature of a component of the motor 16 for example. The sensor(s) 24 may acquire one or more signals indicative of, or useful in inferring, one or more of the operating parameters 46 of the powertrain 20. For example, the sensor(s) 24 may acquire one or more signals indicative of, or useful in inferring, an amount of electric power being discharged from the battery 18 during propulsion of the PWC 10, an amount of motive power being generated by motor 16 during propulsion of the PWC 10, and/or an amount of electric power being generated by the motor 16 when the motor 16 is operating as a generator during regenerative braking of PWC 10. The sensor(s) 24 may acquire one or more signals indicative of, or useful in inferring, a state of charge (SoC) of the battery 18 and/or other parameters of the powertrain 20. The SoC may be expressed as a percentage of the capacity of the battery 18 (e.g., 0%=empty; 100%=full), or as any other suitable indication. The sensor(s) 24 may include one or more potentiometers for obtaining a forward signal indicative of a position of the forward input device 34, and/or obtaining a reverse signal indicative of a position of the reverse input device 22, for instance.

The forward input device 34 may be operatively connected (e.g. in electronic communication, wired) to the controller 29 so that the controller 29 may control some aspects of operation of the powertrain 20 based on the instructions 44. Similarly, the reverse input device 22 may be operatively connected (e.g. in electronic communication, wired) to the controller 29 so that the controller 29 may control some aspects of operation of the powertrain 20 based on the instructions 44. For example, the forward input device 34 may be a source of a forward signal which can vary over time based on changes in a position of a forward lever. This change in the position can result in a change in amplitude, a change in phase, or a change in a frequency of the forward signal, for instance, depending on the type of input device. The controller 29 can have a function to selectively use the forward signal, the reverse signal, or neither, as a throttle signal. The controller 29 can map a given value of the throttle signal to a given power request from the motor 16 based on the instructions 44. As discussed elsewhere herein, the instructions 44 may map the throttle signal to the angular speed of the electric motor 16 or to the torque of the electric motor 16, for example. The mapping may be constant throughout operating conditions, or various mappings can be defined in the instructions 44 and be adapted to different operating modes or operating conditions. For instance, a high-performance mode mapping may be defined as more aggressively mapping smaller changes in the throttle signal to larger changes in requested power, whereas a power-saving mode mapping may be defined as less aggressively mapping corresponding changes in the throttle signal to smaller changes in requested power. More than two driving modes, and associated mappings, may be provided for. In one embodiment where in the reverse mode, the impeller rotates in the second direction R2, drawing water from the steering nozzle 11C and outputting water from the intake 17. The force exerted on the PWC 10 for a same rotation speed and/or as same torque of the electric motor 16 can be significantly different between the forward mode and the reverse mode, as the hydrodynamics of the jet propulsion system 11 may be better optimized for forward operation than for reverse operation, and as such, it may be preferred to map reverse output more aggressively to reverse input than forward output is mapped to forward input, for instance. The controller 29 can be configured to allow the user to switch from one driving mode to another via one or more elements of the user interface 26, such as using the button 45 for instance. The mapping may be the same, or different, between forward and reverse modes of operation, with a significant difference being that the electric motor 16 can be driven to rotate in different orientations between the forward and reverse modes of operation in embodiments where reverse is provided in such manner.

Figure 6:
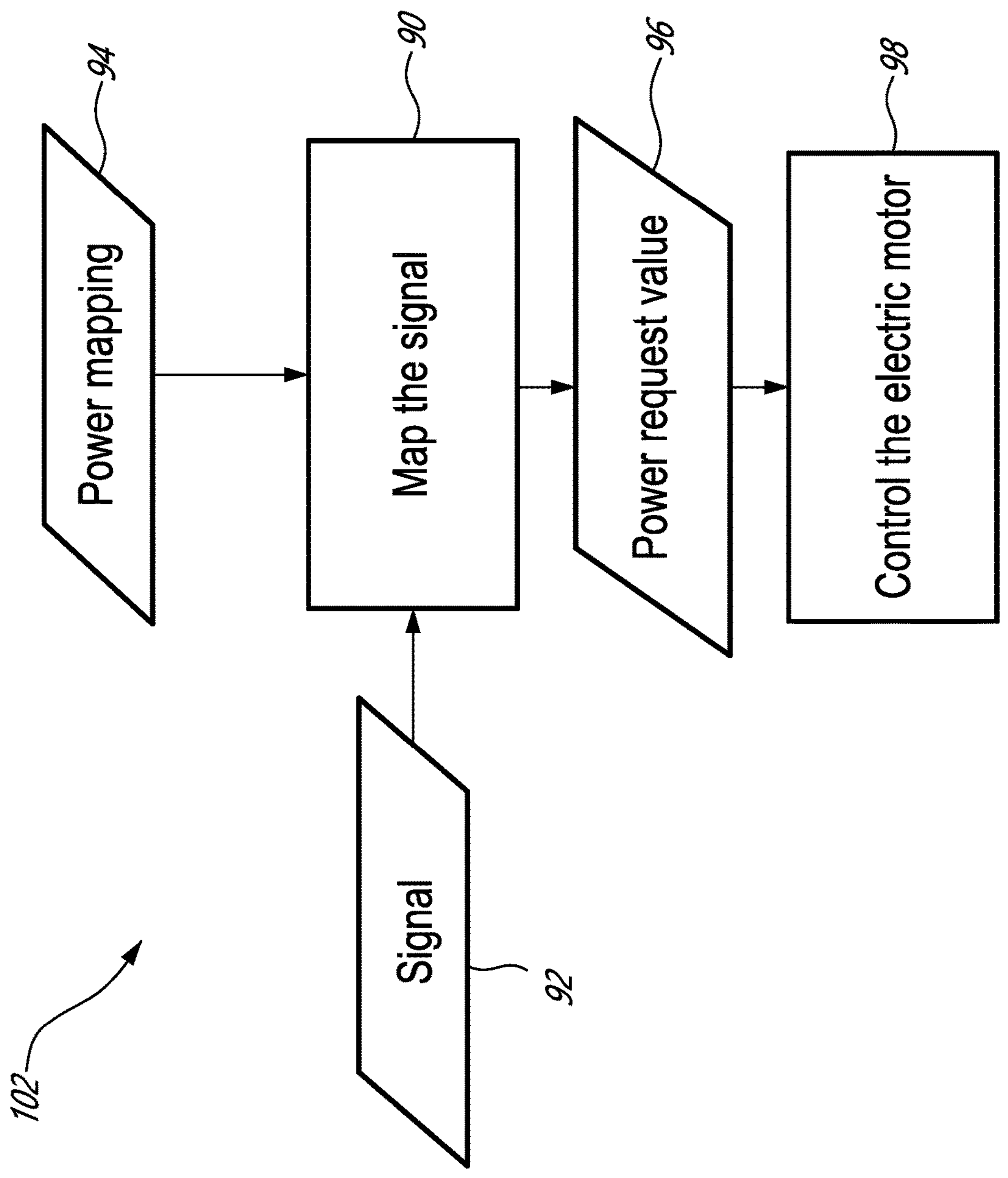
FIG. 6 is a flow chart of a method of operating the watercraft of FIG. 1.

FIG. 6 illustrates an example method 102 of controlling the PWC 10 using the controller 29 to effect propulsion in the forward direction of travel 38 and the reverse direction of travel 36. An input to the method 102 is a throttle signal 92, which may be a forward signal from the forward input device 34 or a reverse signal from the reverse input device 22. Another input to the method 102 is a throttle mapping 94, which may be obtained from the instructions 44 stored in memory 42. In step 90 of the method 102, the controller 29 maps the throttle signal 92 to a power request value 96 based on the throttle mapping 94. In step 98, the controller 29 controls the electric motor 16 based on the power request value 96.

In some implementations, throttle signal 92 corresponds a throttle value selected from a range of throttle values that may be generated by the forward input device 34 or the reverse input device 22. For example, each of the forward input device 34 and the reverse input device 22 may be operable over a range of positions and capable of generating a throttle signal between 0% throttle and 100% throttle depending on their operation by a user. As such, in an example, the throttle signal 92 may correspond to any throttle value in the range of 0% to 100%. The throttle value may then be converted to the power request value 96 that corresponds to a parameter of the electric motor 16. For example, the power request value 96 may include an angular speed (e.g., RPM) value or a torque value.

As provided above, the throttle signal 92 can correspond to a reverse signal or to a forward signal in some embodiments, and as such, the method 102 presented in FIG. 6 can apply to either a reverse mode of operation or to a forward mode of operation. The forward mode can be defined as a mode of operation of the controller 29 in which the electric motor 16 will be controlled in a manner to provide propulsion in the forward direction of travel 38 of the PWC 10. In an embodiment of the PWC 10 having a direct drive configuration, the electric motor 16 is directly connected to drive the impeller 15, i.e. not via a clutch or transmission. In a direct drive configuration, rotating the electric motor 16 in the first direction R1 drives the impeller 15 in the first direction R1 and propels the PWC 10 in the forward direction of travel 38. Accordingly, when in the forward mode, the controller 29 can determine the power request value 96 based on the forward signal, the throttle mapping 94 (e.g., based on a current operating mode such as a power saving mode, a normal mode or a high-performance mode) defined in the instructions 44, and any limits which may be triggered by the controller 29 based on the sensed parameters 46. The power request value 96 can then be applied to the drivetrain by the controller 29 to drive the propulsion of the PWC 10 in the forward direction of travel 38. Similarly, in the direct drive configuration, the reverse mode can be defined as a mode of operation of the controller 29 in which the electric motor 16 will rotate in the second direction R2 to drive the impeller 15 in the second direction R2 and propel the PWC 10 in the reverse direction of travel 36. In the reverse mode, the mapping between the values of the throttle signal 92 and corresponding power request value 96 can be different from, or the same as, in the forward mode. The power request value 96 can be applied to the powertrain by the controller 29 to drive the propulsion of the PWC 10 in the reverse direction of travel 36.

FIG. 6 may enable control the PWC 10 in the forward mode and the reverse mode when only one of the forward input device 34 and the reverse input device 22 are operated at one time, and the electric motor 16 is allowed to slow down (or come to a nearly complete stop) before transitioning between the forward mode and the reverse mode. However, in some implementations, a user may operate the reverse input device 22 immediately after operating the forward input device 34, before the electric motor 16 has slowed down to a safe speed to begin operating in the reverse mode. In other implementations, a user may operate the reverse input device 22 while also operating the forward input device 34. The controller 29 may perform additional steps to accommodate such situations. In one example, if a user rapidly switches between operating the forward input device 34 to operating the reverse input device 22 to initiate braking and/or reverse propulsion, the controller 29 may perform steps to ensure that the reversal of the direction of the electric motor 16 is performed safely after the electric motor 16 has slowed down in the in the direction R1. In another example, if a user is operating both the forward input device 34 and the reverse input device 22 such that a forward signal and a reverse signal are being received by the controller 29 simultaneously, the controller 29 may perform steps to determine which throttle signal is mapped to a power request value used to control the electric motor 16. Accordingly, an aspect of the present disclosure relates to controlling operation of the electric motor 16 in the forward mode and the reverse mode and performing the transitions therebetween.

Figure 7:
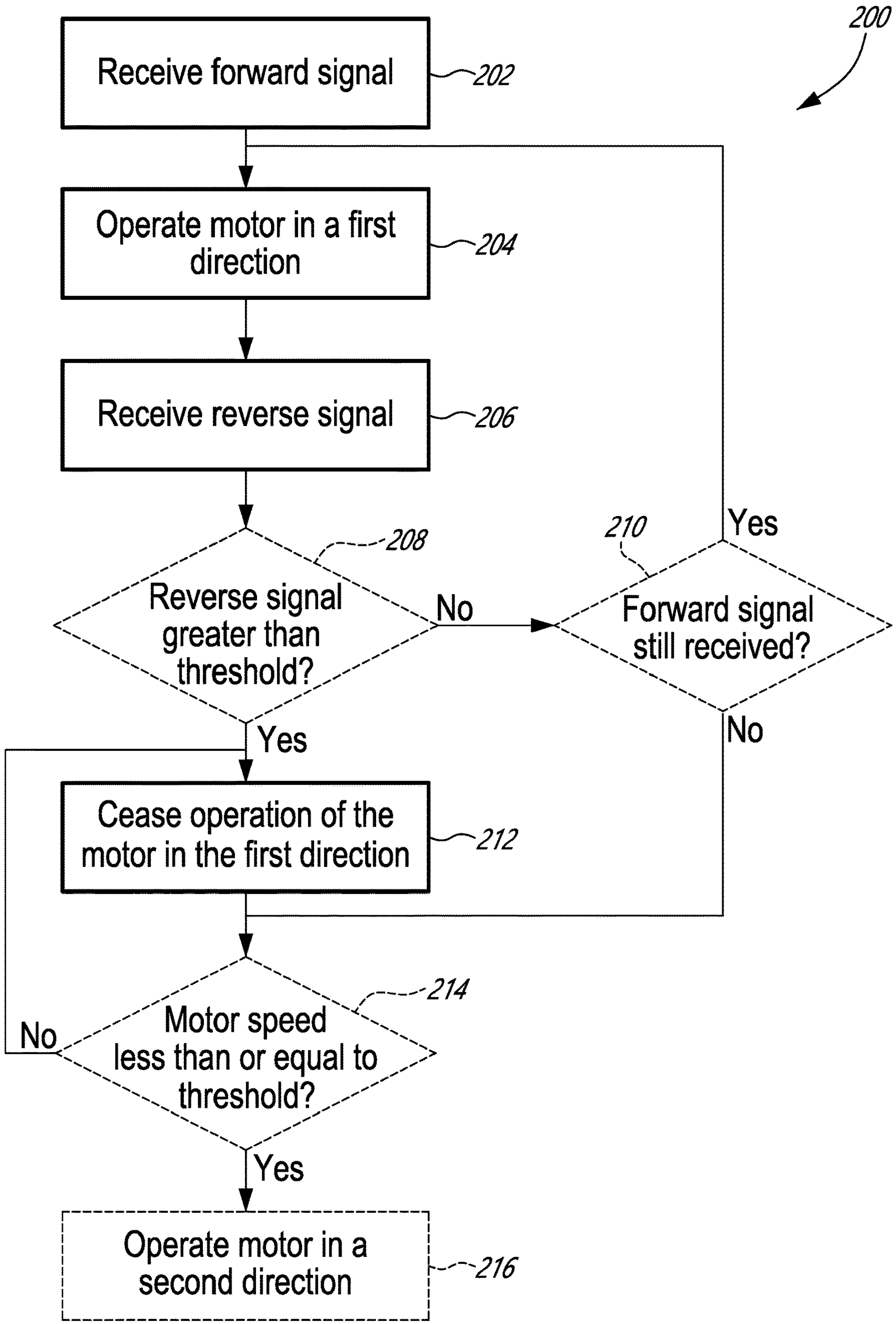
FIG. 7 is a flow chart illustrating another method of operating the watercraft of FIG. 1.

FIG. 7 is a flow diagram illustrating an example method 200 of switching the electric motor 16 from the forward mode to the reverse mode. The method 200 will be described as being performed by the controller 29; however, implementations of the method 200 using other controller or devices are also contemplated.

In step 202, the controller 29 receives a forward signal from the forward input device 34. The forward signal may be generated by a user operating the forward input device 34 to select a throttle value from a range of throttle values, for example. Step 204 includes the controller 29 operating the electric motor in the first direction R1 based on the forward signal to propel the PWC 10 in the forward direction of travel 38. For example, step 204 may cause the impeller 15 to rotate in the first direction R1, drawing water in from the water intake 17 and ejecting water from the steering nozzle 11C. In some implementations, the method 102 of FIG. 6 is performed in step 204 to map the forward signal received in step 202 to a power request value and control the electric motor 16 accordingly. Operating and controlling the electric motor 16 may include, inter alia, delivering electrical power to the electric motor 16 via the PEM 21. The PEM 21 may control the voltage, current and waveform of the electric power to control the electric motor 16 according to the forward signal and the power request value. If the forward signal corresponds to an angular speed value selected from a range of angular speed values for the electric motor 16, then operating the electric motor in the first direction R1 may include operating the electric motor 16 to provide the angular speed value in the first direction R1. Alternatively, if the forward signal corresponds to a torque value selected from a range of torque values for the electric motor 16, then operating the electric motor in the first direction R1 may include operating the electric motor 16 to provide the torque value in the first direction R1.

In step 206, the controller 29 receives a reverse signal from the reverse input device 22. The reverse signal may be generated by a user operating the reverse input device 22 to select a throttle value from a range of throttle values, for example. Step 208 determines if the reverse signal received in step 206 is greater than a defined reverse threshold, which may be stored in the instructions 44. The reverse threshold may include a value that helps determine whether the controller 29 should switch to the reverse mode regardless of the presence of a forward signal. In some embodiments, the reverse threshold may correspond to a threshold throttle value in the range of 0% throttle to 100% throttle. In an example, the threshold throttle value may be 0%. As such, a reverse signal indicating a throttle value greater than 0% (e.g., any operation of the reverse input device 22) may exceed the reverse threshold to switch the PWC 10 to the reverse mode. In another example, the threshold throttle value may be greater than 0% (e.g., equal to 1%, 2%, 5%, 10% or 20%). To exceed the reverse threshold in step 208, the reverse input device 22 may need to be operated to a certain extent (e.g., a lever may need to be pivoted a certain angle by a user) to switch the PWC 10 to the reverse mode. Implementing a threshold throttle value may be greater than 0% may avoid the reverse mode being initiated due to spurious or accidental reverse signals (e.g., if a user accidently bumps the reverse input device 22).

In the case that it is determined in step 208 that the reverse signal received in step 206 is greater than the reverse threshold, then the method 200 may proceed to step 212. Step 212 includes the controller 29 ceasing the operation of the electric motor 16 in the first direction R1. If a forward signal is being received from the forward input device 34 while the reverse signal is above the reverse threshold, then step 212 may override, ignore or otherwise disregard this forward signal. Step 212 may be performed to reduce the speed of the electric motor 16 and prepare the electric motor 16 to be safely operated in the second direction R2 according to the reverse signal. For example, forcing the electric motor 16 into reverse while it is rotating in the first direction R1 at a high angular speed could cause damage to the electric motor 16 and/or discomfort for a user. Ceasing the operation of the electric motor 16 in the first direction R1 may be performed in any one of a number of different ways. In some embodiments, step 212 includes ceasing the delivery of electric power to the electric motor 16 to allow the electric motor 16 to slow down. For example, the controller 29 may send a 0 RPM command to the electric motor 16 to actively slow down the electric motor 16. This may result in electric braking of the electric motor 16 (e.g., regenerative braking or rheostatic braking) to cease operation of the electric motor 16 in the first direction R1. In another example, the controller 29 may send a zero-torque command to the electric motor 16. In other words, ceasing operating of the electric motor 16 in the first direction R1 may correspond to substantially no torque being output from electric motor 16 or being input into electric motor 16 operating as a generator (e.g., the electric motor 16 may be in an idle state). As the electric motor 16 is operated at no load, the total input power to electric motor 16 may be relatively low and substantially equal to (e.g., iron, friction and windage) losses of electric motor 16.

In the case that it is determined in step 208 that the reverse signal received in step 206 is not greater than the reverse threshold, then the method 200 may proceed to step 210. Step 210 includes the controller 29 determining if a forward signal is being received by the controller 29 from the forward input device 34 indicating a request for thrust in the forward direction of travel 38. In some embodiments, step 210 includes determining if the forward signal is greater than a forward threshold (e.g., if a forward throttle value is greater than a threshold throttle value). For example, step 210 may determine if the forward signal corresponds to a forward throttle value greater than 0% throttle. If such a forward signal is received by the controller 29, then the method 200 may return to step 204 and operate in the forward mode until a reverse signal exceeds the reverse threshold and/or until the forward signal becomes less than the forward threshold while a reverse signal is being received. If a forward signal is less than the forward threshold while a reverse signal is being received (or a forward signal is not being received from the forward input device 34 at all), then the method 200 may proceed to step 214.

In step 214, the controller 29 determines if the speed of the electric motor 16 is equal to or below a defined threshold speed in the first direction R1. This threshold speed, which could be stored in the instructions 44, may correspond to a speed at which torque in the second direction R2 can be generated by the electric motor 16 without damage to the electric motor 16, for example. The threshold speed may be between 400 and 1000 RPM, between 500 and 800 RPM, or around 600 RPM, for example. The speed of the electric motor 16 may be measured by the sensor 24. In the case that the speed of the electric motor 16 is greater than the threshold speed, then the method 200 may return to step 212 to allow the electric motor 16 to slow down further. In the case that the speed of the electric motor 16 is less than or equal to the threshold speed, then the method 200 may proceed to step 216.

Step 216 includes the controller 29 operating the electric motor 16 in the second direction R2 based on the reverse signal received in step 206 to propel the PWC 10 in the reverse direction of travel 36. For example, step 216 may cause the impeller 15 to rotate in the second direction R2, drawing water in from the steering nozzle 11C and ejecting water from the water intake 17. In some implementations, step 216 includes performing the method 102 of FIG. 6 to map the reverse signal received in step 206 to a power request value and control the electric motor 16 accordingly. Operating and controlling the electric motor 16 may include, inter alia, delivering electrical power to the electric motor 16 via the PEM 21. The PEM 21 may control the voltage, current and waveform of the electric power to control the electric motor 16 according to the reverse signal and the power request value. If the reverse signal corresponds to an angular speed value selected from a range of angular speed values for the electric motor 16, then operating the electric motor in the second direction R2 may include operating the electric motor 16 to provide the angular speed value in the second direction R2. Alternatively, if the reverse signal corresponds to a torque value selected from a range of torque values for the electric motor 16, then operating the electric motor in the second direction R2 may include operating the electric motor 16 to provide the torque value in the second direction R2.

Step 216 may represent the PWC 10 being successfully switched from the forward mode to the reverse mode. Following step 216, the method 102 of FIG. 6 may be performed to further operate the PWC 10 in the reverse mode. In an embodiment, the controller 29 may trigger an operator-perceptible change in the user interface 26 upon the transition to the reverse mode (i.e., at step 216), which can signify to the user that activation of the reverse input device 22 will now lead to delivering acceleration in the reverse directions of travel 36. In an embodiment, the change in the user interface 26 can include a further change in a color of one or more portions of the graphical user interface 23, and/or a perceptible change in an audible signal (e.g., change a frequency of an audible beep or activating an audible beep in the reverse mode while omitting the audible beep in the forward mode).

It should be noted that the method 200 is provided by way of example. Some steps of the method 200 may be omitted and/or reordered without departing from the scope of the present disclosure. For example, step 208 and/or step 210 may be omitted in some embodiments to reduce or otherwise alter the requirements for switching to the reverse mode. The positions of steps 208 and 210 may also be reversed, such that the controller 29 checks for a forward signal before determining if the reverse signal is greater than a reverse threshold. Alternatively, or additionally, step 214 might not be performed to reduce the delay between receiving a reverse signal in step 206 and operating the electric motor 16 in the second direction in step 216. This might be the case if damage to the electric motor 16 when switching to the reverse mode is not a concern. In some embodiments, step 216 might not be performed. For example, depending on the mapping between the reverse input device 22 and a power request value for the electric motor 16, some reverse signals from the reverse input device 22 may cease operation of the electric 16 in the first direction R1 to slow down (i.e., brake) the PWC 10, but not initiate thrust in the reverse direction of travel 36. For example, reverse signals corresponding to throttle values between 0% and 20% might cease operation of the electric motor 16 in the first direction R1, and reverse signals corresponding to throttle values greater than 20% initiate operation of the electric motor 16 in the second direction R2 in step 216.

Figure 8A:
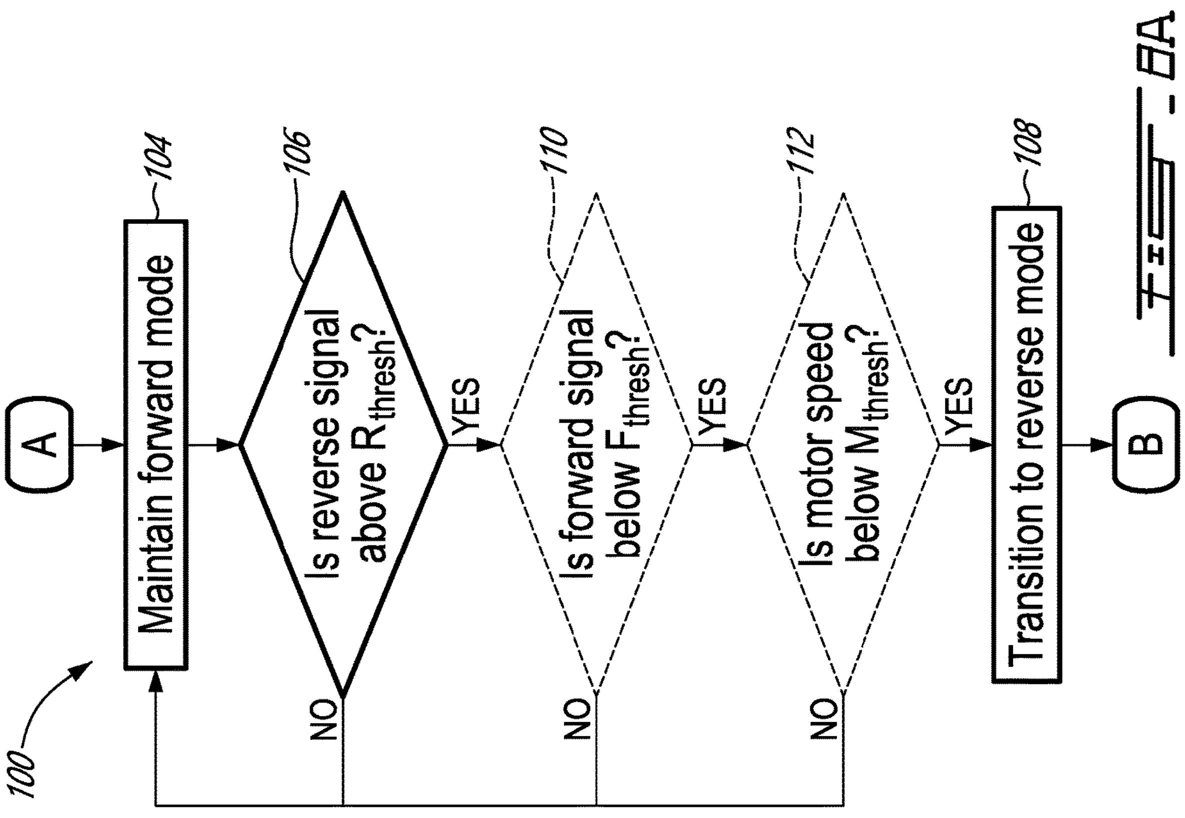
FIGS. 8A and 8B are flow charts illustrating further methods of operating the watercraft of FIG. 1.

Turning now to FIG. 8A, another example method 100 of switching (transitioning) between a forward mode and a reverse mode for the PWC 10 will now be presented. At step 104, the PWC 10 maintains or operates in the forward mode. For example, in step 104, the PWC 10 may perform the method 102 of FIG. 6 to generate propulsion in the forward direction of travel 38. At step 106 of the method 100, the controller 29 determines whether a reverse signal received from the reverse input device 22, for example, is above a reverse signal threshold ($R_{thresh}$). If not, the PWC 10 continues to maintain the forward mode in step 102. If the reverse signal does exceed $R_{thresh}$, then the method 100 may proceed to step 106. As discussed elsewhere herein, a reverse signal above $R_{thresh}$ can be generated when a user squeezes a reverse lever or rotates a rotatable handle of the reverse input device 22 to a significant extent, for instance.

Upon detection at step 106 of a reverse signal above $R_{thresh}$, in some embodiments, the controller 29 may directly transition, at step 108, to the reverse mode. In an alternate embodiment, the transition to reverse mode may be contingent upon one or more additional checks. For instance, at step 110 the controller 29 can optionally verify that the forward signal is substantially 0 (i.e. below a given forward signal threshold ($F_{thresh}$)), which can correspond to the forward input device 34 being within a given range of positions corresponding to no substantial activation by the user. The forward signal threshold can correspond to 3% or 5% of a throttle lever actuation range, for example. This verification can be performed as a safety check to ensure that the reverse input device 22 was not activated inadvertently and that the reverse request was intentional by the user. If a forward signal is still being received, which can mean that the forward input device 34 is being activated at the same time as the reverse input device, the reverse signal can be ignored and the PWC 10 caused to maintain, back at step 104, the forward mode. Step 110 may be considered a forward throttle check. In some embodiments, it can be preferred to ignore any forward signal when a reverse signal above $R_{thresh}$ is being received and operate the powertrain in a manner to produce a reverse-oriented force on the PWC 10 (e.g. braking) in this scenario. In addition to, or alternately to, a forward throttle check, a motor speed check can be performed at step 112. Indeed, at step 112, the controller 29 can determine whether the motor rotation speed (e.g. RPM) is below a given motor speed threshold ($M_{thresh}$) or not. If the motor rotation speed is above $M_{thresh}$, the method 100 can go back to maintaining the forward mode at 104. If the motor rotation speed is below or equal to $M_{thresh}$, the method 100 can proceed to transition to the reverse mode at step 108. The motor speed check can be provided to avoid sudden reversals of force which may be of a nature to surprise a user and/or damage the electric motor 16, for instance. In an embodiment, $M_{thresh}$ can be a low RPM threshold such as between 400 and 1000 RPM, or between 500 and 800 RPM, or around 600 RPM for example. Accordingly, after determining at step 106 that the reverse signal is above $R_{thresh}$ and satisfying any additional conditions in optional steps 110, 112, the method 100 proceeds to step 108, allowing the PWC 10 to transition from a forward mode to a reverse mode. It will be noted that any one or more of the thresholds (e.g. $R_{thresh}$, $F_{thresh}$, $M_{thresh}$) may be configured to change based on operating modes of the PWC 10 and/or based on sensed values of parameters 46 and instructions 44. In some embodiments, rather than switching directly between forward mode and reverse mode based on meeting any specified conditions or not, one or more intermediary state can be defined which trigger one or more physical change in the PWC 10 or its mode of operation, and the ultimate transition to reverse may be contingent upon satisfying one or more addition condition when in the intermediary state.

Figure 8B:
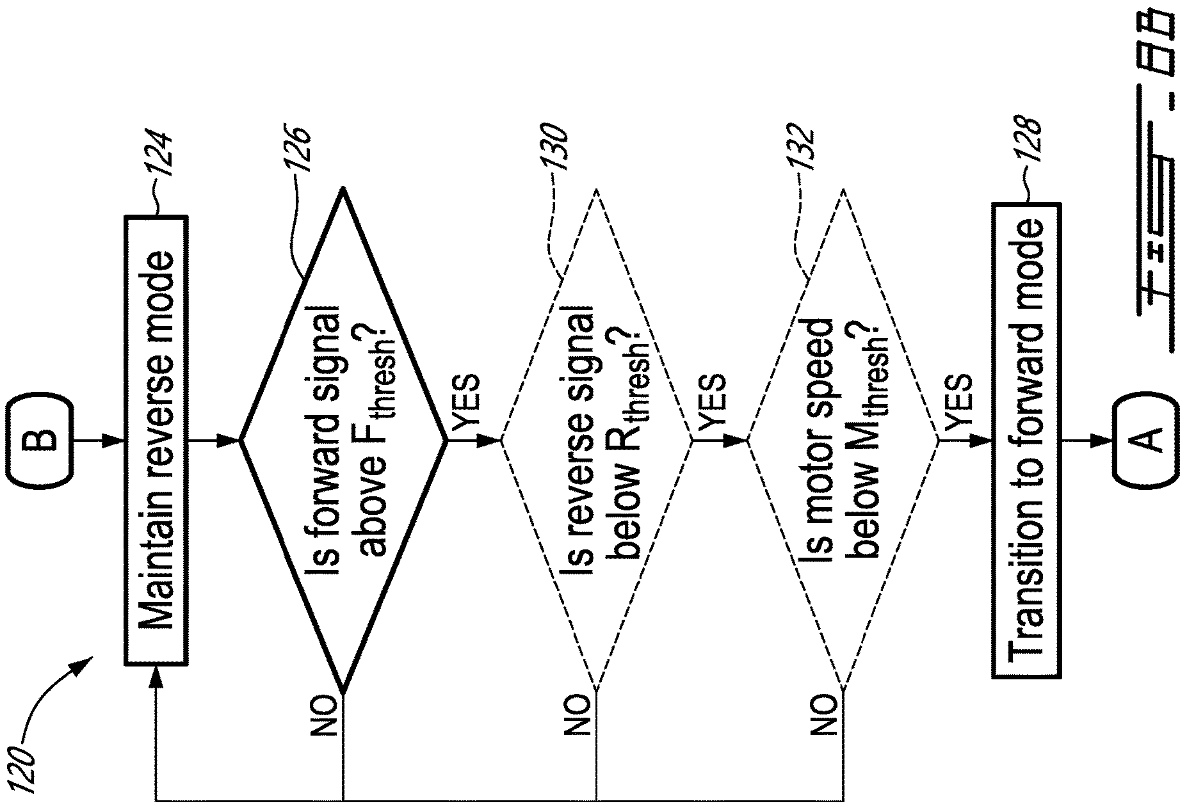

Turning now to FIG. 8B, an example method 120 of switching (transitioning) between a reverse mode and a forward mode will now be presented. At step 124, the PWC 10 maintains the reverse mode. At step 126 of method 120, the controller 29 determines whether a forward signal is above a forward signal threshold ($F_{thresh}$). If not, the PWC 10 continues to maintain 102 the reverse mode at 124. If the forward signal does exceed $F_{thresh}$, then the method 120 may proceed to step 130. A forward signal above $F_{thresh}$ can be generated when a user squeezes a forward lever or rotates a rotatable handle of the forward input device 34 to a significant extent, for instance.

Upon detection at step 126 of a forward signal above $F_{thresh}$, in some embodiments, the controller 29 may directly transition, at step 128, to the forward mode. In an alternate embodiment, the transition to forward mode may be contingent upon one or more additional checks. For instance, at step 130 the controller 29 can optionally verify that the reverse signal is substantially 0 (i.e. below a given reverse signal threshold ($R_{thresh}$)), which can correspond to the throttle lever being within a given range of positions corresponding to no substantial activation by the user. The reverse signal threshold can correspond to 3% or 5% of throttle lever actuation range, for example. This verification can be performed as a safety check to ensure that the forward input device 34 was not activated inadvertently and that the forward request was intentional by the user. If a reverse signal is still being received, which can mean that a reverse input device 22 is being activated at the same time as the forward input device 34, the forward signal can be ignored and the PWC 10 caused to maintain, back at step 124, the reverse mode. Step 130 can be considered a reverse throttle check. In some embodiments, it can be preferred to ignore any reverse signal when a forward signal above $F_{thresh}$ is being received and operate the powertrain in a manner to produce a thrust in the forward direction of travel 38. In addition to, or alternately to, a reverse throttle check, a motor speed check can be performed at step 132. Indeed, at step 132, the controller 29 can determine whether the motor rotation speed (e.g. RPM) is below a given motor speed threshold ($M_{thresh}$) or not. If the motor rotation speed is above $M_{thresh}$, the method 120 can go back to maintaining the reverse mode at 124. If the motor rotation speed is below $M_{thresh}$, the method 120 can proceed to transition to forward mode at step 128. The motor speed check can be provided to avoid sudden reversals of force which may be of a nature to surprise a user and/or cause damage to the electric motor 16, for instance. In an embodiment, $M_{thresh}$ can be a low RPM threshold such as between 400 and 1000 RPM, or between 500 and 800 RPM, or around 600 RPM for example. Accordingly, after determining at step 126 that the forward signal is above $F_{thresh}$ and satisfying any additional condition, the method proceeds to step 128, allowing the PWC 10 to transition from a reverse mode to a forward mode. It will be noted that any one or more of the thresholds (e.g. $R_{thresh}$, $F_{thresh}$, $M_{thresh}$) may be configured to change based on operating modes of the PWC 10 and/or based on sensed values of parameters 46 and instructions 44. In some embodiments, rather than switching directly between reverse mode and forward mode based on meeting any specified conditions or not, one or more intermediary state can be defined which trigger one or more physical change in the PWC 10 or its mode of operation, and the ultimate transition to forward mode may be contingent upon satisfying one or more addition condition when in the intermediary state.

Figure 9:
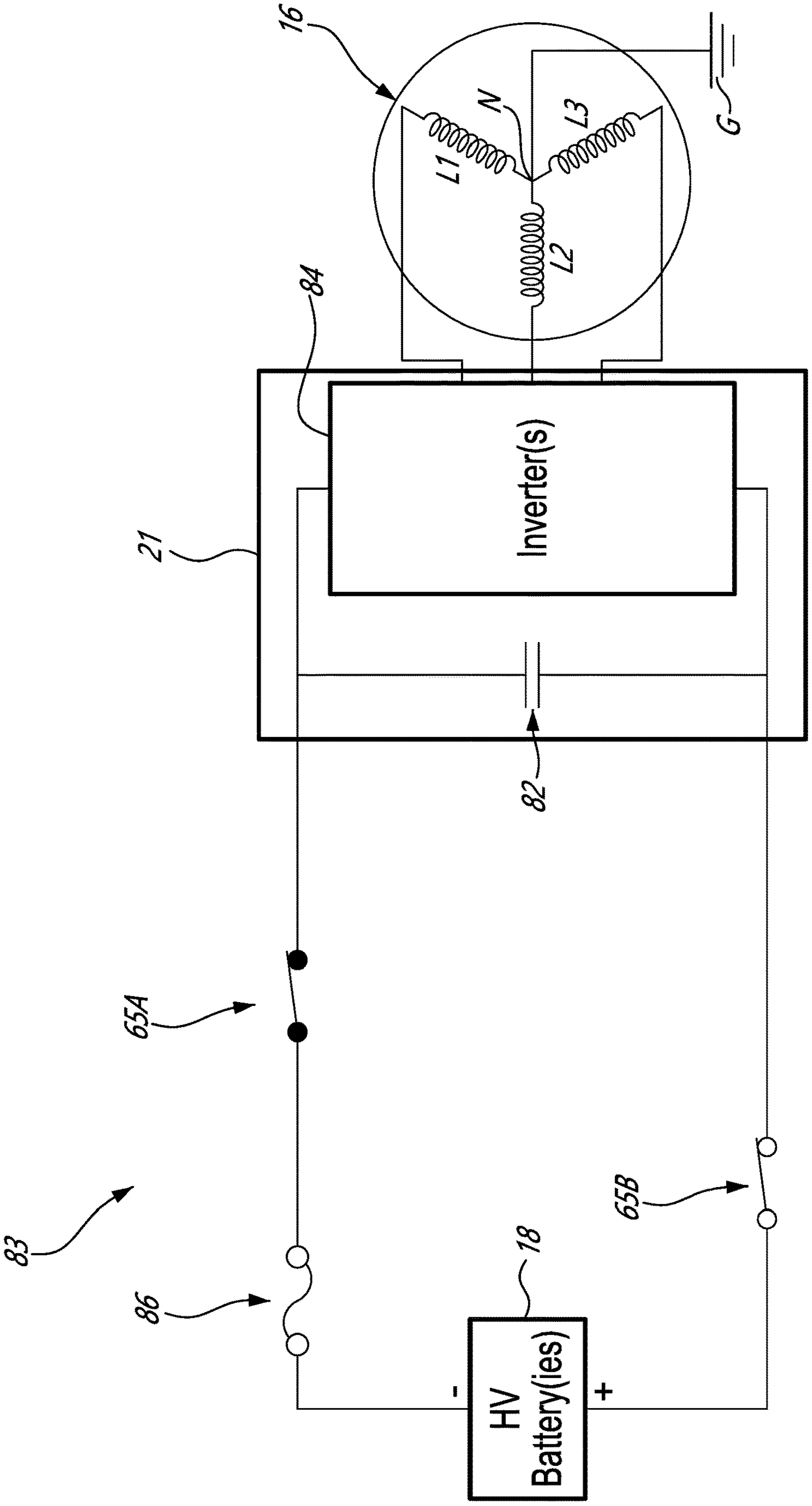
FIG. 9 is a block diagram illustrating an example circuit of the watercraft of FIG. 1.

FIG. 9 is a block diagram illustrating an example circuit 83 for the powertrain the PWC 10. The PEM 21 may be operatively connected between the battery 18 and the electric motor 16 to control the delivery of electric power from the battery 18 to electric motor 16. The electric motor 16 may be a polyphase (e.g., 3-phase) synchronous motor and may include a plurality of armature (e.g., stator) windings such as armature windings L1, L2, L3. The armature windings L1, L2, L3 may be connected in a wye or delta configuration. A neutral point N may be connected to ground G.

PEM 21 may include an inverter 84 and a capacitor 82. The capacitor 82 may be electrically connected in parallel with the inverter 84. The capacitor 82 may be a smoothing capacitor within the PEM 21. The circuit 83 may also include the fuse 86 operative to provide overcurrent protection for the circuit 83.

In preparation for propulsion of PWC 10, switches 65A and 65B are closed. Switches 65A and 65B may be operatively connected to be controlled via the controller 29. In some embodiments, components of the circuit 83 such as one or more of the switches 65A and 65B may be disposed on a circuit board that is part of the battery management system (BMS) of PWC 10. In some embodiments, switch 65B may be a high power relay mounted to a frame or structure of a battery pack.

As can be understood, the examples described above and illustrated are intended to be example only. The technology presented herein may be used on other types of vehicles than electric personal watercrafts in alternate embodiments.

What is claimed is:

1. A method of controlling a watercraft, the watercraft comprising an electric motor, a first user input device, and a second user input device separate from the first user input device, the method comprising:

receiving a first signal from the first user input device;

operating the electric motor in a first direction based on the first signal to propel the watercraft in a forward direction;

receiving a second signal from the second user input device; and operating the electric motor in a second direction based on the second signal to propel the watercraft in a reverse direction, wherein operating the electric motor in the second direction comprises determining that the second signal corresponds to a value exceeding a threshold value to disregard the first signal.

2. The method of claim 1, further comprising:

responsive to receiving the second signal, ceasing operation of the electric motor in the first direction to reduce a speed of the electric motor, wherein operating the electric motor in the second direction based on the second signal is performed responsive to the speed of the electric motor being less than or equal to a threshold speed.

3. The method of claim 2, wherein:

operating the electric motor in the first direction comprises delivering electrical power to the electric motor; and ceasing operation of the electric motor in the first direction comprises ceasing delivery of electric power to the electric motor.

4. The method of claim 1, wherein:
the second signal corresponds to an angular speed value selected from a range of angular speed values; and
operating the electric motor in the second direction based on the second signal comprises operating the electric motor to provide the angular speed value in the second direction.

5. The method of claim 1, wherein operating the electric motor in the second direction based on the second signal comprises determining that the first signal is not being received from the first user input device.

6. The method of claim 1, wherein:
the watercraft comprises a jet propulsion system having a water intake, a nozzle and an impeller connected to the electric motor;
operating the electric motor in the first direction causes the impeller to rotate in the first direction, drawing water in from the water intake and ejecting water from the nozzle; and
operating the electric motor in the second direction causes the impeller to rotate in the second direction, drawing water in from the nozzle and ejecting water from the water intake.

7. A watercraft comprising:
an electric motor;
a first user input device;
a second user input device separate from the first user input device; and
a controller connected to the electric motor, the first user input device and the second input device, the controller operable to perform the method of claim 1.

8. The watercraft of claim 7, wherein the first user device and second user device each comprise a respective lever operable through a range of positions.

9. The watercraft of claim 7, further comprising handlebars to steer the watercraft, the first user device and the second user device being disposed on the handlebars.

10. The watercraft of claim 9, wherein the first user device is disposed on a first side of the handlebars and the second user device is disposed on a second side of the handle bars opposite the first side.

11. A method of controlling a watercraft, the watercraft comprising an electric motor, a first user input device and a second user input device separate from the first user input device, the method comprising:
receiving a first signal from the first user input device;
operating the electric motor in a first direction based on the first signal to propel the watercraft in a forward direction;
receiving a second signal from the second user input device while receiving the first signal from the first user input device; and
responsive to receiving the second signal, ceasing operation of the electric motor in the first direction.

12. The method of claim 11, wherein ceasing operation of the electric motor in the first direction comprises determining that the second signal corresponds to a value exceeding a threshold value to disregard the first signal.

13. The method of claim 11, wherein:
operating the electric motor in the first direction comprises delivering electrical power to the electric motor; and
ceasing operation of the electric motor in the first direction comprises ceasing delivery of electric power to the electric motor.

14. A watercraft comprising:
an electric motor;
a first user input device;
a second user input device separate from the first user input device; and
a controller connected to the electric motor, the first user input device and the second input device, the controller operable to perform the method of claim 11.

15. A method of controlling a watercraft, the watercraft comprising a motor, a first user input device and a second user input device separate from the first user input device, the method comprising:
receiving, from the first user input device, a first signal corresponding to a first value selected from a first range of values, the first value comprises a first angular speed value selected from a first range of angular speed values;
operating the motor in a first direction, based on the first value, to propel the watercraft in a forward direction wherein operating the motor in the first direction based on the first value comprises operating the motor to provide the first angular speed value in the first direction;
receiving, from the second user input device, a second signal corresponding to a second value selected from a second range of values; and
operating the motor in a second direction, based on the second value, to propel the watercraft in a reverse direction.

16. The method of claim 15, wherein:
the second value comprises a second angular speed value selected from a second range of angular speed values; and
operating the motor in the second direction based on the second value comprises operating the motor to provide the second angular speed value in the second direction.

17. The method of claim 16, wherein the first range of angular speed values is different from the second range of angular speed values.

18. A watercraft comprising:
a motor;
a first user input device;
a second user input device separate from the first user input device; and
a controller connected to the motor, the first user input device and the second input device, the controller operable to perform the method of claim 15.

* * * * *